US 12,175,007 B2

(12) United States Patent
Marett et al.

(10) Patent No.: US 12,175,007 B2
(45) Date of Patent: *Dec. 24, 2024

(54) DATA INSPECTION SYSTEM AND METHOD

(71) Applicant: Cobalt Iron, Inc., Lawrence, KS (US)

(72) Inventors: Robert Merrill Marett, Lawrence, KS (US); Richard Raymond Spurlock, Lawrence, KS (US); Gregory John Tevis, Solvang, CA (US)

(73) Assignee: Cobalt Iron, Inc., Lawrence, KS (US)

( * ) Notice: Subject to any disclaimer, the term of this patent is extended or adjusted under 35 U.S.C. 154(b) by 67 days.

This patent is subject to a terminal disclaimer.

(21) Appl. No.: 18/138,560

(22) Filed: Apr. 24, 2023

(65) Prior Publication Data

US 2023/0259657 A1 Aug. 17, 2023

Related U.S. Application Data

(63) Continuation of application No. 17/093,995, filed on Nov. 10, 2020, now Pat. No. 11,663,362.

(51) Int. Cl.
*G06F 21/64* (2013.01)
*H04L 9/40* (2022.01)

(52) U.S. Cl.
CPC .......... *G06F 21/64* (2013.01); *H04L 63/1425* (2013.01); *H04L 63/20* (2013.01)

(58) Field of Classification Search
USPC ............................................................ 726/1
See application file for complete search history.

(56) References Cited

U.S. PATENT DOCUMENTS

| 7,546,629 | B2 | 6/2009 | Albert et al. |
| 8,127,366 | B2 | 2/2012 | Vainstein et al. |
| 9,530,001 | B2 * | 12/2016 | Sallam ................. G06F 21/566 |

(Continued)

FOREIGN PATENT DOCUMENTS

| CN | 105320735 A | 2/2016 |
| EP | 3617918 A1 | 3/2020 |

(Continued)

OTHER PUBLICATIONS

Extended European search report, Application No. 21160892.2, Aug. 6, 2021, pp. 1-9.

(Continued)

*Primary Examiner* — Sakinah White Taylor
(74) *Attorney, Agent, or Firm* — Kory D. Christensen

(57) ABSTRACT

A system continuously monitors, by at least one inspector, an inspection work queue for a class of inspection operation request, detects, by the at least one inspector, the class of inspection operation request in the inspection work queue, removes, by the at least one inspector, the class of inspection operation request from the inspection work queue, determines, by the at least one inspector, one of a class of inspection tool and a specific level of inspection to perform for the class of inspection operation request that references a data object, and executes, by the at least one inspector, the one of the class of inspection tool and the specific level of inspection for the class of inspection operation request that references the data object at one of a certain time and a certain event during a data lifecycle of the data object.

18 Claims, 13 Drawing Sheets

(56) References Cited

U.S. PATENT DOCUMENTS

| | | | |
|---|---|---|---|
| 2007/0282951 A1* | 12/2007 | Selimis | H04L 69/08 |
| | | | 709/205 |
| 2010/0071024 A1 | 3/2010 | Eyada | |
| 2012/0196565 A1* | 8/2012 | Raleigh | H04M 15/80 |
| | | | 455/406 |
| 2013/0275637 A1 | 10/2013 | Gomes | |
| 2014/0096252 A1 | 4/2014 | Dalcher | |
| 2014/0165130 A1 | 6/2014 | Zaitsev | |
| 2016/0350173 A1* | 12/2016 | Ahad | H04L 67/02 |
| 2018/0096153 A1 | 4/2018 | DeWitte et al. | |
| 2019/0261222 A1* | 8/2019 | Raleigh | H04L 63/105 |
| 2019/0312890 A1 | 10/2019 | Perilli | |
| 2020/0184757 A1* | 6/2020 | Moeller | G07C 9/00571 |
| 2020/0233959 A1 | 7/2020 | Spurlock et al. | |
| 2020/0236121 A1* | 7/2020 | Spurlock | G06F 21/566 |
| 2021/0185075 A1 | 6/2021 | Adams | |

FOREIGN PATENT DOCUMENTS

| | | | | |
|---|---|---|---|---|
| EP | 3683680 A1 | 7/2020 | | |
| ES | 2755780 T3 * | 4/2020 | | G06F 21/56 |
| WO | 2016138067 A1 | 9/2016 | | |

OTHER PUBLICATIONS

Extended European search report, Application No. 21160902.9, Aug. 6, 2021, pp. 1-9.
U.S. Appl. No. 17/094,002, Office Action dated Feb. 3, 2023, 19 pages.

* cited by examiner

Inspection Class Policy

```
// Define policies to direct class of inspection operations on specified data
{"InspectionClassPolicy":
    // specify data to be associated with this inspection class policy. Multiple data rules can be defined
    "DataRules": [{
        "IncludeData": "RegularExpression",
        "ExcludeData": "RegularExpression",
        "DataWorkload": "TypeOfWorkload",
        "DataType":     "TypeOfData",
        "DataCopyType": "TypeOfDataCopy",
        "DataOwner":    "OwnerOfData",
        "DataCreationTime": "TimeOfDataCreation",
        "LastModificationTime": "TimeOfLastModification",
    }],
    // upon occurrence of an event or condition, perform a class of inspection operation, or
    // a cyber security analysis, or a data protection operation. Multiple inspection events can be defined
    "InspectionEvent": [{
        "EventOrCondition": "EventOrConditionType",
        "ClassOfInspection": {
            "InspectionClassType": "TypeOfInspectionToPerform",
            "InspectionLevel":     "LevelOfInspectionToPerform"
        },
        "CyberSecurityAnalysis": "TypeOfAnalysisToPerform",
        "DataProtectionOperation": "TypeOfDataProtectionOperationToPerform"
    }],
    // if this is an executable file, program library, or other data associated with a program, perform a scan before running
    "PerformScanIfExecutable": "YesOrNo",
    // allow data associated with this inspection class policy to have class of inspection operations automatically adjusted
    "EnableDynamicInspection": "YesOrNo"
}
```

FIG. 11

Class of Inspection Operation Request

```
// Request form for a class of inspection operation
{"ClassOfInspectionOperationRequest":
    // link to data on which to perform a class of inspection operation on
    "DataObject": "LinkToData",
    // specific class of inspection tool to use
    "ClassOfInspectionTool": "LinkToClassOfInspectionTool",
    // specific level of inspection to perform (if applicable)
    "ClassOfInspectionLevel": "InspectionLevel"
}
```

FIG. 12

DATA INSPECTION SYSTEM AND METHOD

CROSS-REFERENCE TO RELATED APPLICATIONS

This application is a continuation of U.S. patent application Ser. No. 17/093,995, filed Nov. 10, 2020, for DATA INSPECTION SYSTEM AND METHOD, which is incorporated herein by reference.

BACKGROUND

Protection of data in a modern computing network is an amazingly complex and costly endeavor. While protection of data is challenging, it is made even more difficult in view of the ever-increasing frequency and sophistication of cyber-attacks. Cyber-criminal activities constantly threaten the availability and integrity of data. Enterprise financial pressures leave insufficient funds available to protect large and complex corporate data. However, because of cyber-attacks and ransomware events, it is critical to invest in cyber-security of data. Unfortunately, existing tools for securing data against cyber-attacks are insufficient and limited in their capabilities and effectiveness.

It is with these issues in mind, among others, that various aspects of the disclosure were conceived.

SUMMARY

According to one aspect, a data inspection system and method is provided for dynamically adaptive and policy-based management of data for advanced cyber security and cyber resiliency. As an example, an inspection director may be executed by a first server computing device that comprises an Adaptive Data Protection (ADP) analytics engine server computing device. An inspection manager may be executed by a second server computing device that comprises an ADP accelerator server computing device. The inspection director may continually monitor for a new operation, condition, or event and may detect the new operation, condition, or event. Upon detecting the new operation, condition, or event, the inspection director may use an inspection class policy to determine a class of inspection operation as well as a specific data object and place the class of inspection operation and specific data object as a request into an inspection work queue. One or more inspectors may continually monitor the inspection work queue and may detect the request in the inspection work queue. The one or more inspectors may remove the request from the inspection work queue. The one or more inspectors may determine one of a class of inspection tool and a specific level of inspection to perform on the specific data object for the request and then may execute the one of the class of inspection tool and the specific level of inspection on the specific data object for the request.

A system may include a memory and at least one processor to continuously monitor, by at least one inspector, an inspection work queue for a class of inspection operation request, detect, by the at least one inspector, the class of inspection operation request in the inspection work queue, remove, by the at least one inspector, the class of inspection operation request from the inspection work queue, determine, by the at least one inspector, one of a class of inspection tool and a specific level of inspection to perform for the class of inspection operation request that references a data object, and execute, by the at least one inspector, the one of the class of inspection tool and the specific level of inspection for the class of inspection operation request that references the data object at one of a certain time and a certain event during a data lifecycle of the data object.

According to another aspect, a method includes continuously monitoring, by at least one inspector associated with a data inspection server computing device having at least one processor, an inspection work queue for a class of inspection operation request, detecting, by the at least one inspector, the class of inspection operation request in the inspection work queue, removing, by the at least one inspector, the class of inspection operation request from the inspection work queue, determining, by the at least one inspector, one of a class of inspection tool and a specific level of inspection to perform for the class of inspection operation request that references a data object, and executing, by the at least one inspector, the one of the class of inspection tool and the specific level of inspection for the class of inspection operation request that references the data object at one of a certain time and a certain event during a data lifecycle of the data object.

According to an additional aspect, a non-transitory computer-readable storage medium includes instructions stored thereon that, when executed by a computing device cause the computing device to perform operations, the operations including continuously monitoring, by at least one inspector, an inspection work queue for a class of inspection operation request, detecting, by the at least one inspector, the class of inspection operation request in the inspection work queue, removing, by the at least one inspector, the class of inspection operation request from the inspection work queue, determining, by the at least one inspector, one of a class of inspection tool and a specific level of inspection to perform for the class of inspection operation request that references a data object, and executing, by the at least one inspector, the one of the class of inspection tool and the specific level of inspection for the class of inspection operation request that references the data object at one of a certain time and a certain event during a data lifecycle of the data object.

According to another aspect, a system includes a memory and at least one processor to continuously store metadata results associated with a plurality of ransomware attacks, a plurality of inspection class policy definitions, a plurality of data protection operations, and operational forensics data as machine learning training data, continuously monitor for one of a new security condition and event, detect one of the new security condition and event, determine an appropriate inspection class policy based on the one of the new security condition and event, based on the inspection class policy, determine one to implement of a class of inspection operation, a cyber security analysis, and a data protection operation, and execute one of the class of inspection operation, the cyber security analysis, and the data protection operation based on the machine learning training data.

According to an additional aspect, a method includes continuously storing, by at least one processor, metadata results associated with a plurality of ransomware attacks, a plurality of inspection class policy definitions, a plurality of data protection operations, and operational forensics data as machine learning training data, continuously monitoring, by the at least one processor, for one of a new security condition and event, detecting, by the at least one processor, one of the new security condition and event, determining, by the at least one processor, an appropriate inspection class policy based on the one of the new security condition and event, based on the inspection class policy, determining, by the at least one processor, one to implement of a class of inspection operation, a cyber security analysis, and a data protection operation, and executing, by the at least one processor, one of the class of inspection operation, the cyber security analysis, and the data protection operation based on the machine learning training data.

According to another aspect, a non-transitory computer-readable storage medium, having instructions stored thereon that, when executed by a computing device cause the computing device to perform operations, the operations including continuously storing metadata results associated with a plurality of ransomware attacks, a plurality of inspection class policy definitions, a plurality of data protection operations, and operational forensics data as machine learning training data, continuously monitoring for one of a new security condition and event, detecting one of the new security condition and event, determining an appropriate inspection class policy based on the one of the new security condition and event, based on the inspection class policy, determining one to implement of a class of inspection operation, a cyber security analysis, and a data protection operation, and executing one of the class of inspection operation, the cyber security analysis, and the data protection operation based on the machine learning training data.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 11 illustrates an example of an inspection class policy of the system according to an example embodiment.

FIG. 12 illustrates an example of a class of inspection operation request of the system according to an example embodiment.

DETAILED DESCRIPTION

Figure 1:
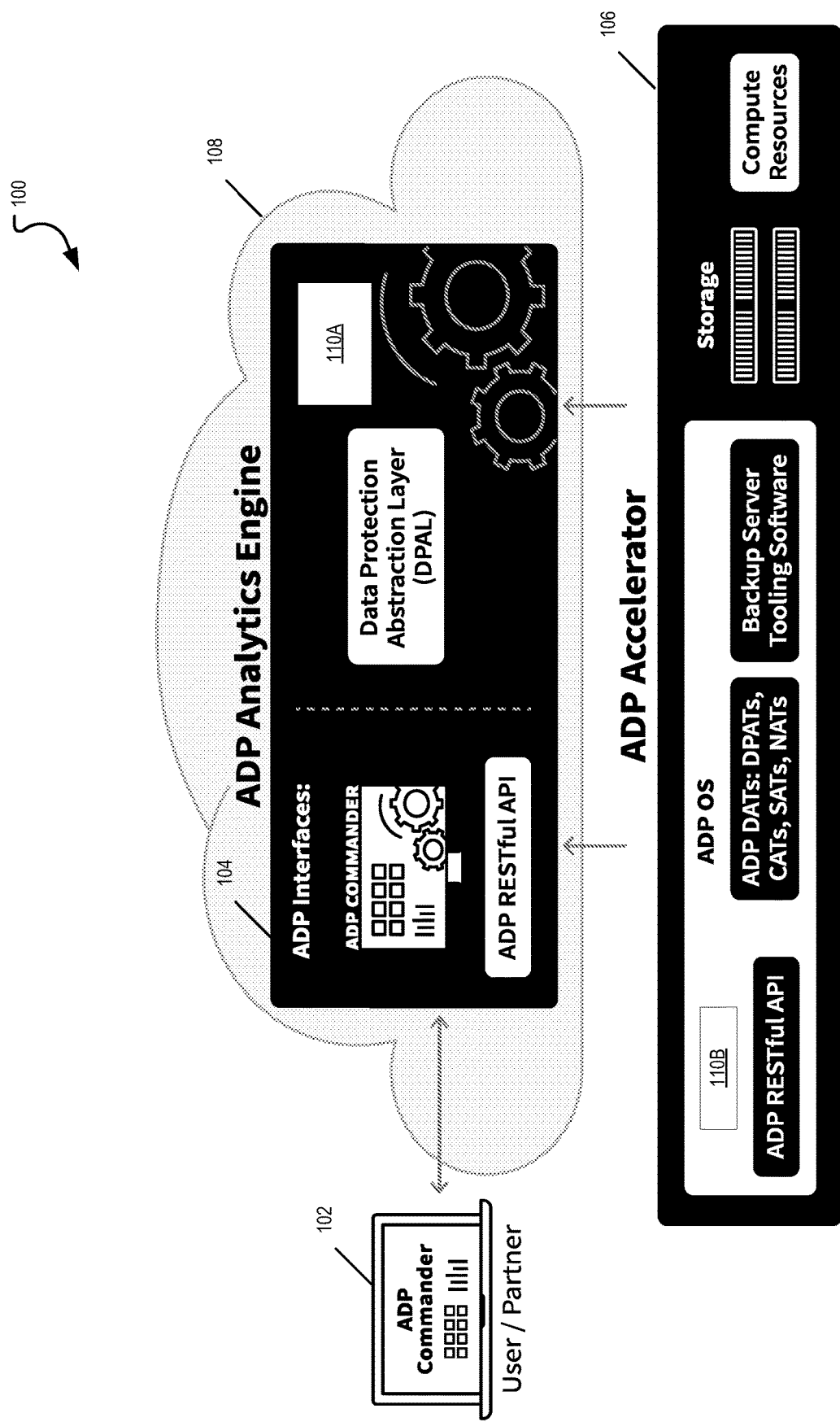
FIG. 1 is a block diagram of a data inspection system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

Client computing devices and server computing devices may communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

Aspects of a system and method for dynamically adaptive and policy-based management of data for advanced cyber security and cyber resiliency may include a data inspection server computing device that executes a data inspection application that continuously monitors, by at least one inspector, an inspection work queue for a class of inspection operation request, detects, by the at least one inspector, the class of inspection operation request in the inspection work queue, removes, by the at least one inspector, the class of inspection operation request from the inspection work queue, determines, by the at least one inspector, one of a class of inspection tool and a specific level of inspection to perform for the class of inspection operation request that references a data object, and executes, by the at least one inspector, the one of the class of inspection tool and the specific level of inspection for the class of inspection operation request that references the data object at one of a certain time and a certain event during a data lifecycle of the data object.

Cyber security includes the combination of security techniques, tools, processes, and others that protect data and other information technology (IT) resources from penetration, theft, disruption, redirection, and other damage. Cyber resiliency may be the state or benefit of data or other IT resources resulting from effective cyber security measures that provide protection.

As noted herein, protection of data in modern enterprises is an amazingly complex and costly endeavor. Adding to the challenges of protecting data is the ever-increasing frequency and sophistication of cyber-attacks. Cyber-criminal activities may constantly threaten the availability and integrity of critical data. Enterprise financial pressures may leave insufficient funds available to protect increasingly large and complex data. However, with the realities of cyber-attacks and ransomware events, the need to invest in cyber security of data is no longer an option. Additionally, effectively securing data is extremely difficult and operationally complex. Existing tools for securing data against cyber-attacks are insufficient and are very limited in their scope of their capabilities and effectiveness.

Security, financial, and operational issues may make daily data protection and data security operations into one of the most computationally complex challenges that corporate networks may face. More advanced, more cost-effective, and more adaptive techniques of securing data against cyber-attacks are desired. In particular, techniques are desirable to enable granular and flexible policy-based management for securing data. Techniques are also desirable to leverage and orchestrate a variety of existing cyber security technologies and to dynamically adapt to changing security threat landscapes based on events in the environment, advancements in best practices, and technology improvements.

Many enterprises may employ numerous, disjoint, security point products from a variety of different vendors in an attempt to deal with security issues and attempt to harden their data and environment from a security perspective. The products add to the complexities, operational challenges, and costs of the problem (both financially and computationally). These products also tend to introduce additional islands of data and data security operational management.

As an example, a large financial organization may desire to implement protections for their most valuable at-risk systems, applications, and data. Using conventional techniques available to large enterprises, the organization may have built an architecture that meets security requirements but introduces many disparate products, complex operations, new security exposures between the security products, and is computationally and financially expensive. Further, there is no comprehensive manner to dynamically apply various security technologies to different types of data based on corporate priorities and corporate policies. As an example, backup software protects source data and places backup data in secure storage and/or offline tape volumes. For critical systems, backups are sent to dedicated backup storage that includes replication to secure cyber vaults. A cyber vault may be a secured repository for storage of data. The cyber vaults necessitate many cyber recovery servers. Each cyber recovery server may provide data recovery services for a small amount of data that may be compromised by a security attack. Additional security software that performs data content inspection for specific data may ensure that recovered data does not contain ransomware or malware content.

There are a number of drawbacks associated with this conventional approach of existing security techniques for cyber security of data. The existing techniques have tremendous complexities and costs due to a lack of integration amongst a multitude of disparate security tools. In addition, in some cases, this security product layering approach to securing data may violate the security principle of least privilege. For example, with this approach, security personnel often gain access to application or backup data that they normally are not allowed to access. Existing techniques do not allow an automated means of applying security technologies to data. In addition, the existing techniques do not allow granular means of applying different security technologies adaptively to different data based on various criteria. The existing techniques are reactive rather than proactive in applying security. Further, the security controls, practices, and discipline occur too late in the data lifecycle (e.g., the security controls, practices, and discipline are not applied at the data source, are not run at data replication, and are run in a final cyber recovery landing space for the data). In addition, the existing techniques provide specific security functions and do not orchestrate various existing security techniques in a comprehensive manner that allows for applying a policy to secure data throughout its lifecycle in a consistent, automated, and granular manner. Once the conventional security measures are put in place, they are often immediately obsolete. Existing techniques and processes for securing data against cyber-attacks tend to be static and do not automatically adjust to changing threats.

In particular, conventional management of anti-virus and anti-malware content inspection techniques are lacking. Existing anti-virus and anti-malware tools can monitor and detect cyber-attacks and scan data for virus and malware content. However, the tools are limited in the scope of monitoring and inspect only specific streams of data. Typically, a snapshot of data at a point in time is captured and a one-time security inspection of the data may be performed. This existing technique does not include applying security policies that may include what type of data to scan, when to scan the data, and what technology to use to scan the data, and what actions to take on the data given certain results.

The inspection system and method provides adaptive cyber security for data. The system may utilize an automated method that includes policy-based management for securing data that orchestrates a variety of cyber-security and other technologies. The system may automatically apply appropriate cyber-security and other technologies, dynamically adjust levels of security, and dynamically adjust what cyber protection actions to take against which data at various stages of data lifecycle based on a security policy, various conditions, environments, value of the data, and other contingencies. The system can dynamically adapt to changing security threat landscapes based on events in the environment, advancements in best practices, and technology improvements, among others.

The system may utilize an inspection class policy to automatically assign appropriate cyber-security technologies and/or multi-layered cyber-security analysis and operations for identified data providing a more granular application of security policy to specific identified data. The system includes an inspection director and an inspection manager to enforce class of inspection operations within a defined security access zone and enforce other security disciplines based on one or more policies specified in an inspection class policy.

The inspection director may orchestrate a variety of cyber-security technologies and/or cyber-security analysis and operations including performing different levels and types of encryption, different levels and types of content inspection, content validation, over-time comparisons and evaluations, backup and replication and disaster recovery operations, and others. The inspection director also may specify alternative or additional security actions including data inspection operations or analysis be performed on specific identified data under certain conditions or events. The identified data may be primary, backup, disaster recovery, replication, and recovered copies of data, among other types of data. Further, the inspection director may dynamically change a type of data inspection to perform or may dynamically adjust a level of content inspection to perform or may perform different analysis on identified data, based on certain conditions or events. By changing a type of data inspection or adjusting a level of data content inspection, or performing a different analysis on identified data, the inspection director may dynamically adapt to changing security threat landscapes. The inspection director may use metadata associated with a particular data protection or security condition or event as machine learning training data and adjust future cyber security analysis based on the training data. As an example, the inspection director may save metadata results of a previous ransomware attack, a previous inspection class policy definition at the time of the attack, a result of a previous data protection operation taken upon indication of a previous ransomware attack, and other operational behavior forensics data as machine learning training data. The inspection director may analyze the impact of a previous ransomware attack, a previous inspection class policy, a result of a previous data protection operation taken upon indication of a previous ransomware attack, and other operational behavior forensics. The inspection director may determine a different data protection operation to take or a different class of inspection operation to perform or another change to take to lower the risk of further cyber-attack penetration upon a future indication of a ransomware attack.

In addition, the inspection director may perform security operational behavior forensics and based on the results, may dynamically adjust a class of inspection or may adjust a level of content inspection to perform. In addition, the inspection director may perform different analysis or take other actions on identified data in the future to dynamically improve the cyber-security of the specific data.

As a result, the system is able to provide comprehensive, adaptive, policy-based cyber-security.

As an example, an inspection director may be executed by a first server computing device that comprises an Adaptive Data Protection (ADP) analytics engine server computing device. An inspection manager may be executed by a second server computing device that comprises an ADP accelerator server computing device or another computing device. The inspection director may continually monitor for a new operation, condition, or event and may detect the new operation, condition, or event. Upon detecting the new operation, condition, or event, the inspection director may use an inspection class policy to determine a class of inspection operation and may notify the inspection manager to place the class of inspection operation as a request into an inspection work queue. One or more inspectors may continually monitor the inspection work queue and may detect the request in the inspection work queue which may reside on an ADP accelerator server computing device. As a further example, an inspection manager may continually monitor for a new operation, condition, or event and may detect the new operation, condition, or event. Upon detecting the new operation, condition, or event, the inspection manger may use an inspection class policy to determine a class of inspection operation and may place the class of inspection operation as a request into an inspection work queue. The one or more inspectors may remove the request from the inspection work queue. The one or more inspectors may determine one of a class of inspection tool and a specific level of inspection to perform for the request and then may execute the one of the class of inspection tool and the specific level of inspection for the request.

FIG. 1 shows a block diagram of a computing system that includes a data inspection system 100 according to an example embodiment. The data inspection system 100 includes at least one client computing device 102 that is in communication with at least one Adaptive Data Protection (ADP) analytics engine server computing device 104 (hereinafter ADP analytics server computing device) and at least one ADP accelerator server computing device 106 via a communications network 108.

According to an exemplary embodiment, the data inspection system 100 may include one logical instance of the ADP analytics server computing device 104, a plurality of client computing devices 102, and a plurality of ADP accelerator server computing devices 106, among other computing devices. Each entity, company, organization, corporation, etc. may have its own particular ADP accelerator server computing device 106 that communicates with the ADP analytics server computing device 104. Each ADP accelerator server computing device 106 may be implemented based on particular workloads, a computing architecture, a network architecture, and a cloud computing network deployment for that particular entity.

In one embodiment, the ADP analytics server computing device 104 may include a plurality of hardware and software modules that may perform various functions. The ADP analytics server computing device 104 may receive metadata exhaust from each ADP accelerator server computing device 106 or from inspectors of the system 100 and may push information and messages to the ADP accelerator server computing device 106 such as software upgrades, configuration instructions, policies, operational commands, security controls, etc. In addition, the ADP analytics server computing device 104 may store and process information associated with analytical intelligence, automation, and best practice capabilities within its modules that may optimize ADP accelerator operations.

The ADP analytics server computing device 104 may include a data protection abstraction layer (DPAL) that may interact with ADP data acquisition tools (DATs) and may handle data protection, cloud computing, storage, and network products and services, enabling the management of data protection, cloud computing, storage, and network products and services in a consistent manner in the system 100. The ADP analytics server computing device 104 may provide an ADP commander user interface and a RESTful application programming interface (API). In an example embodiment, the ADP analytics server computing device 104 may provide capabilities and services that may be delivered as a service from at least one global cloud computing provider.

The ADP accelerator server computing device 106 may include compute resources (e.g., hardware servers, virtual servers (e.g., VMware virtual machines), and various cloud compute resources (e.g., virtual, bare metal, or hosted systems)). A bare metal virtualization may include running a virtual operating system using a hypervisor. A hosted system may run a virtual operating system using virtual hardware on a host operating system, which uses physical hardware. The compute resources may include memory (e.g., RAM and/or ROM), network interfaces, management interfaces, storage area network (SAN) interfaces, and other resources.

The ADP accelerator server computing device 106 may include an ADP operating system (ADP OS) that provides management, monitoring, reporting, alerting, control, integration, orchestration, ADP analytics exhaust management, and other modules and services that may monitor and control data protection operations that may be monitored by the ADP accelerator server computing device 106 for the system 100. The ADP OS may provide environmental monitoring including the measuring of temperature, power, and other variables associated with the system 100 and its associated network, cloud computing system, and other computing systems and environments.

The ADP OS may provide ADP data acquisition tools (ADP DATs). The ADP DATs may manage, monitor, and control a variety of data protection, cloud computing, storage, and network products and services. ADP DATs may include a data protection acquisition tool (DPAT), cloud acquisition tool (CAT), storage acquisition tool (SAT), and a network acquisition tool (NAT).

Further, the ADP OS may include and manage backup server tooling software. This may include a set of backup server tooling software products (e.g., IBM SPECTRUM PROTECT™, VERITAS NETBACKUP™, VEEAM, etc.), cloud backup services, server or storage snapshot utilities, application backup tools, or other backup or replication utilities that may execute many backup, restore, and long term data retention operations on data in the system 100 and its associated network, cloud computing system, and other computing systems and environments. In addition to backup server tooling software, the ADP OS also may include and manage operating system software associated with computing devices in the system 100, file systems associated with computing devices of the system 100, and other software resources associated with the system 100.

In short, the ADP OS may interact with the ADP analytics server computing device 104 to manage and automate data protection operations of the system 100.

Storage of the system 100 may include backups of system user data that may be stored where the user desires, e.g., on local storage computing devices and on cloud storage, among other locations. Storage may be physically included in the ADP accelerator server computing device 106 and/or may be separate such as external storage arrays and/or stored on cloud-based storage. However, the storage may appear to a user as being logically attached to the ADP accelerator server computing device 106 and may be used by ADP accelerator server computing device services.

According to an example embodiment, the ADP accelerator server computing device 106 may be deployed on client premises, in a data center, in a remote office, in a private cloud computing environment, in a public cloud computing environment, and in a third-party hosting/data center, among other locations. The ADP accelerator server computing device 106 may be deployed as a virtual appliance in a virtual environment (e.g., VMWARE® Cloud), as a physical appliance, or in a public cloud computing environment (on virtual, bare metal, or hosted systems). In order to provide greater degrees of data security and availability, the ADP accelerator server computing device may be configured to create additional copies of data via services such as data replication and data copies to various media types, or storage classes.

The ADP accelerator server computing device 106 may have associated data protection hardware and software infrastructure that may include the compute resources discussed above, the storage discussed above, network components, traffic patterns, firmware levels, microcode, data protection software tooling, cloud functionality, and others. In addition, the ADP accelerator server computing device 106 may be in communication via the communications network 108 with additional data protection infrastructure including other protected servers, storage devices, applications, data, backup servers, networks, deduplication appliances, cloud workloads, and others.

In one embodiment, the ADP accelerator server computing device 106 may be considered an ADP conduit. An ADP conduit may provide industry services such as ticketing, orchestration, service management, and other solutions. An ADP conduit may be deployed to implement special security access controls that may be requested for various customer environments.

The ADP accelerator server computing device 106 may operate autonomously from the ADP analytics server computing device 104 but also may be integrated with the ADP analytics server computing device 104. The ADP accelerator server computing device 106 may share metadata exhaust data with the ADP analytics server computing device 104 and may in return receive analytics-derived guidance in order to optimize data inspection operations for the system 100. In addition, operating system software, ADP OS software, backup server tooling software, device firmware/microcode, and other software may be transmitted from the ADP analytics server computing device 104 to the ADP accelerator server computing device 106.

The system 100 may include adaptive data inspection interfaces including a graphical user interface (GUI) and a RESTful API as discussed above. The system 100 provides ADP Commander, a GUI that comprises a dashboard portal that graphically provides information and controls regarding the system 100. The ADP Commander may be presented from the perspective, view, and authentication permissions of each user of the system 100. In addition, an administrator of the system 100 may access the portal to view the status for each user/partner associated with the system 100. The administrator may resolve issues, execute ADP accelerator server computing device 106 deployments, and may view analytics regarding the system 100 or individual customer domains. Services and solutions of the data inspection system 100 may be shared amongst, and delivered through, multiple partners (e.g., separate companies and organizations and sub-organizations of companies) to multiple sets of clients and customers. A partner of the system 100 may view a particular portion of the system environment from the perspective, view, and authentication permissions of the partner. A partner may view partner customer environments. End users of the system 100 may view a portion of the system 100 from the perspective, view, and authentication permissions of the user. A customer may view ADP accelerator server computing device information and computing devices that may be associated with the ADP accelerator server computing device 106.

The ADP Commander user interface may provide complete multi-tenancy functions/features at different levels (e.g., partners, users) and may provide comprehensive reporting, monitoring, control, security, chargeback, showback, provisioning of client computing devices, policy management, capacity management, management of system inventories, and others at all levels.

In addition, the RESTful API provides ADP functionality and all ADP and data inspection system functions may be accessed and managed using the RESTful API.

The ADP analytics server computing device 104 may have an inspection director 110A and the ADP accelerator server computing device 106 may have an inspection manager 110B that communicates with storage that may include at least one database that comprises a non-relational database and/or a relational database for storing user information, among other data. As an example, the information may be stored in a relational database management system (RDBMS), an open source distributed database management system such as a Not only SQL (NoSQL) database management system, an in-memory database (IMDB) management system, or another appropriate database management system. As an example, each user associated with the system 100 may have associated information stored in the database such as an identifier associated with the user and a role associated with the user that may be dynamically modified by the system 100.

The client computing device 102 may include a display and an input device. The display is used to display visual components of the inspection director 110A, such as at a user interface, e.g., ADP Commander. In one example, the user interface may display a user interface of the inspection director 110A, and a representation of the requested resources received from the ADP analytics server computing device 104. The display can include a cathode-ray tube display, a liquid-crystal display, a light-emitting diode display, a touch screen display, and/or other displays. The input device is used to interact with the inspection director 110A or otherwise provide inputs to the client computing device 102 and may include a mouse, a keyboard, a trackpad, and/or the like. The input device may be included within the display if the display is a touch screen display. The input device allows a user of the client computing device 102 to manipulate the user interface of the inspection director 110A or otherwise provide inputs to be transmitted to the ADP analytics server computing device 104.

The at least one ADP analytics server computing device 104 is configured to receive data from and/or transmit data to the at least one client computing device 102 through the communications network 108. Although the at least one ADP analytics server computing device 104 is shown as a single server, it is contemplated that the at least one server computing device 104 may include multiple servers, for example, in a cloud computing configuration.

The one or more computing devices communicate and coordinate their actions by passing messages over the communications network 108. The communications network 108 can be one or more of the Internet, an intranet, a cellular communications network, a WiFi network, a packet network, or another wired and/or wireless communication network or a combination of any of the foregoing. As an example, the one or more computing devices communicate data in packets, messages, or other communications using a common protocol, e.g., Hypertext Transfer Protocol (HTTP) and/or Hypertext Transfer Protocol Secure (HTTPS). As an example, the data inspection system 100 may be a cloud-based computer system or a distributed computer system that may include one or more cloud-based computer systems including AMAZON WEB SERVICES, VMWARE CLOUD, MICROSOFT AZURE, IBM CLOUD, GOOGLE CLOUD PLATFORM, ALIBABA CLOUD, and other cloud computing services.

The inspection director 110A may be a component of an application and/or service executable by the client computing device 102 and/or the ADP analytics server computing device 104 and/or the ADP accelerator server computing device 106. For example, the inspection director 110A may be a single unit of deployable executable code or a plurality of units of deployable executable code. According to one aspect, the inspection director 110A may be a web application, a native application, and/or a mobile application (e.g., an app) downloaded from a digital distribution application platform that allows users to browse and download applications developed with mobile software development kits (SDKs) including the App Store and GOOGLE PLAY®, among others. The inspection director 110A may be installed on the client computing device 102, which may have a WINDOWS operating system, APPLE MACOS operating system, a Linux operating system, the iOS operating system or an ANDROID™ operating system, among other operating systems. In an exemplary embodiment, the inspection director 110A may include a first client component executed by the client computing device 102 and a second server component executed by the at least one ADP analytics server computing device 104 and/or the ADP accelerator server computing device 106.

Conventional backup techniques may use a protection class policy to define how to manage and protect data. Data protection techniques used to manage and protect data may use the protection class policy that may define what backup operations to perform on data, when to perform backups, where to store backup copies for data, how long to keep backup copies, and how many versions of backup copies to keep.

The system 100 provides data and metadata content inspection. Data content inspection is a process of scanning or monitoring data for viruses, malware, data distortion, data destruction, and others. There are a number of data content inspection tools and technologies available including anti-virus, anti-malware, and other types of data scanning software. In addition, there may be inspection tools that may support specific workloads (e.g., a specific inspection tool that supports LINUX operating system binary files, or a specific inspection tool that supports a specific type of database). The system 100 is able to leverage and use data content inspection technologies and tools using policies and dynamically adjust how the technologies may be optimally applied to data based on conditions and events. In addition, the system is able to analyze data protection and security conditions and events. The results of the data inspection operations may be used to learn and adjust future data inspection operations to increase security.

The system 100 may use protection class policies and inspection class policies. The inspection class policy may specify a class of inspection type (e.g., a tool) and a level of inspection to be performed on a specific type of data. As an example, a specific inspection tool may be used for executable files on a particular operating system to inspect for malware particular to that environment. The inspection class policy may also define a class of inspection type and level of inspection to be performed on specific data at a certain time or across certain points or upon occurrence of a certain event during the data lifecycle (e.g., at a backup, recovery or replication event, or upon occurrence of some other event such as a ransomware attack).

A class of inspection may be a specific type of data content inspection technology or tool (e.g., an anti-virus or anti-malware scan) or a class of inspection may be a specific level of inspection (e.g., a quick scan versus a full, in-depth scan) using a specific type or multiple types of data content inspection technology or technologies. Some data inspection technologies may allow multiple levels of inspection. A class of inspection operation is an actual use or execution of a class of inspection on specific data (e.g., performing a data scan or data inspection action on specific data identified by the inspection class policy).

For example, for specific data identified by the inspection class policy, the inspection class policy may define a class of inspection (e.g., an inspection class type or level of content inspection) operation to be performed on the data and when in the lifecycle of the data (e.g., upon data creation, modification, backup, recovery, or other data protection operation event) the operation is to occur. The inspection class policy may define additional class of inspection operations to be performed, and when in the lifecycle, for the specific identified data or for other identified data.

The inspection class policy also may define a class of inspection operation to be performed on identified data upon occurrence of a certain condition or event. As an example, a condition may be a high security alert condition, a government alert condition, a company security alert condition, or some other security or other condition. As a further example, an event may be a ransomware attack event, a security audit in progress event, some other security event, a data protection operation event (e.g., upon a data protection pattern change, or upon a data creation, deletion, distortion, mutation, modification, backup, replication, restore, or other data event), or another type of event (e.g., a disaster recovery test). In an inspection class policy, specific data may be identified and assigned a specific class of inspection (e.g., an inspection class type or level of inspection) based on various criteria. Specific data may be identified to be associated with a particular inspection class policy through use of various data rules such as include or exclude statements with file naming patterns, or through direct assignment of an inspection class policy to particular data, or using another technique. As an example, data with file or object names having a file naming pattern or another pattern in a particular inspection class policy may be identified and assigned security policies defined in an inspection class policy, including a specific class of inspection.

Criteria used to identify specific data may include data rules that may include inclusions or exclusions of data or file name, data workload (e.g., application type such as a specific filesystem, database, email, or other application), data type (e.g., file and file type, object, structured data, block data), data owner, data creation time, data last modification time, and others. In addition, an inspection class policy may also include a policy field that specifies that an additional class of inspection operation, using a specific class of inspection, be performed on specific identified data under certain conditions or events. As an example, an inspection class policy may specify that, under a normal condition, specific data files may have an anti-virus or anti-malware scan performed at a time of recovery but not during backup, replication, or other points in the lifecycle of the data. Further, an inspection class policy may specify that an anti-virus or anti-malware scan is to run on any executable file prior to the file being run. As a further example, an inspection class policy may specify that a container object have a completely different type of data inspection tool or technology applied to it at a certain time or based on certain events.

An inspection class policy may specify that a particular data protection operation or a particular cyber-security analysis be performed on a specific type of data at a certain time or across certain points or upon occurrence of a certain condition or event. A particular data protection operation may include performing an additional backup, replication, restore, or other operation on the specific identified data or specific type of data.

A particular cyber security analysis may include a specific type of analysis performed by the inspection director 110A. As an example, one type of cyber security extrapolation analysis performed by the inspection director 110A may include continuously monitoring for a new security condition or event, detecting a new security condition or event (e.g., indications of a cyber-attack against a particular system or data object), and initiating a class of inspection operation on the specific identified data or specific type of data and evaluating the results. If the results show indications of infected data extrapolating that isolated event to other similar or related systems or data objects globally across all domains (e.g., systems or data objects on the same network or of the same application type), then this may result in identifying the possible broader or global threat or impact to other systems or data objects, sending security notifications, and taking preventative measures on a broader scale to prevent or minimize a possible broader impact (e.g., initiating a broader set of class of inspection operations, restricting network access in adjacent security zones, increasing security levels). For example, if a specific operating system, data type, or application may be attacked in one customer domain, analysis might identify another similar operating system, data type, or application in a different customer domain that might be at higher risk of the attack and the inspection director may send notifications and take further preventative measures to protect the other operating system, data type, or application.

As another example, another type of cyber security historical analysis performed by the inspection director may include continuously monitoring for a new security condition or event, detecting a new security condition or event involving a particular system or data object or data type, performing a historical analysis of attacks against a particular system or data object or data type, determining possible attack patterns or timings, identifying attack sources, and taking preventative measures on a broader scale to prevent or minimize a possible broader impact. The inspection director may review an isolated security event within a specific customer domain and perform cyber security analysis at a global level across other customer domains. Further, observations taken by the inspection director from analysis in one customer domain may indicate that a certain preventative measure is to be taken at a second customer domain to provide additional cyber security protection. The certain preventative measure at the second customer domain may not be apparent from monitoring or cyber security analysis only within that second customer domain. As a result, a more adaptive approach to applying a security policy to specific data at a more granular level (including down to individual files, objects, data chunks, or other data) based on various conditions or events may be provided.

The inspection director 110A may be executed by the analytics server computing device 104 and may initiate, monitor, and manage class of inspection operations to ensure a specific inspection class type or level of content inspection occurs, and at the appropriate times, as specified by an inspection class policy. The inspection director 110A may also dynamically adjust a class of inspection operation or may initiate a cyber security analysis or data protection operation based on various operations, conditions, and events. The inspection director 110A may continually monitor for new conditions and events and monitor inspection class policies. For each new condition or event (including a "normal" condition), the inspection director 110A determines each class of inspection operation, cyber security analysis, or data protection operation that may be associated with an inspection class policy. For each required class of inspection operation or data protection operation, the inspection director 110A may determine an inspection manager 110B on a particular ADP accelerator server computing device 106 to carry out the class of inspection operation or data protection operation and may notify the inspection manager. For each cyber security analysis operation, the inspection director 110A may invoke the appropriate analysis module.

As an example, the inspection manager 110B may be executed by the ADP accelerator server computing device 106. The inspection manager 110B may monitor for a notification from the inspection director 110A. When the inspection manager 110B detects a notification from the inspection director 110A and if the notification indicates that a data protection operation is to be performed, the inspection manager 110B may initiate the data protection operation on the ADP accelerator server computing device 106. If the notification indicates that a class of inspection operation is to be performed, the inspection manager 110B may create a new class of inspection operation request and may put the request on the inspection work queue. Further, the inspection manager 110B may continually monitor for a new operation, condition, or event and may detect the new operation, condition, or event. Upon detecting the new operation, condition, or event, the inspection manager 110B may perform analysis of the new operation, condition, or event, may determine a new class of inspection operation to perform, and may place the class of inspection operation as a request into an inspection work queue.

Figure 2:
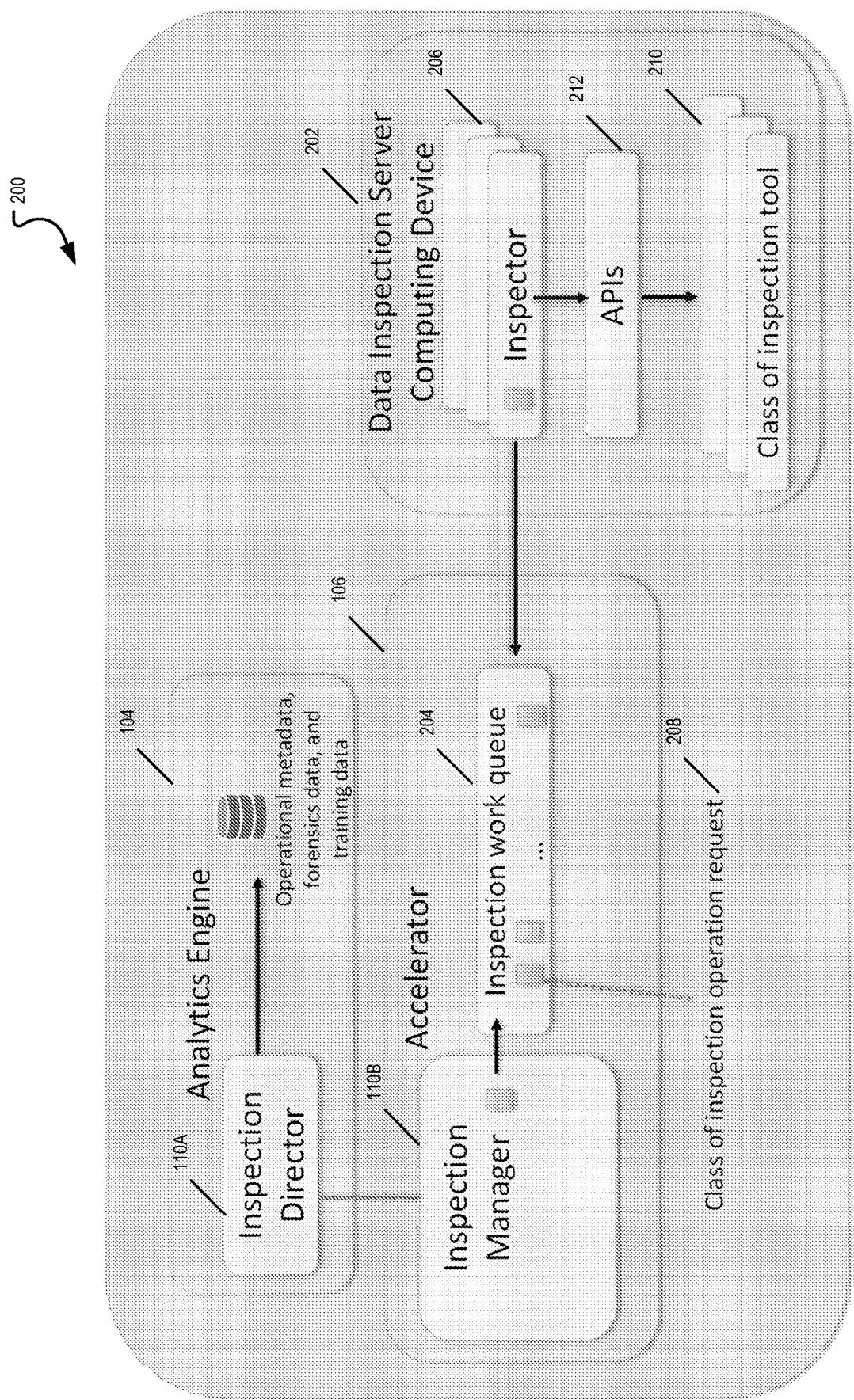
FIG. 2 illustrates another block diagram of the data inspection system according to an example embodiment.

FIG. 2 illustrates the data inspection system 100 including a data inspection server computing device 202 according to an example embodiment. As shown in FIG. 2, the ADP analytics server computing device 104 may include the inspection director 110A. The ADP accelerator server computing device 106 may include the inspection manager 110B. The ADP accelerator server computing device 106 also may have access to an inspection work queue 204. The data inspection server computing device 202 may have one or more inspectors 206 that have access to the inspection work queue 204. Each inspector 206 may be able to utilize APIs or Command Line Interfaces (CLIs) and a plurality of class of inspection tools to process the inspection work queue 204 and each class of inspection operation request 208 in the inspection work queue 204. The data inspection server computing device 202 is further illustrated in FIG. 3.

Inspectors 206 of the data inspection server computing device 202 may perform the class of inspection operations. An inspector 206 may be executed by the data inspection server computing device 202, may be outside of an encrypted security context of the ADP accelerator server computing device 106, and may be used as a clean room area to restore and inspect data. The inspector 206 may continually monitor the inspection work queue 204 for a new class of inspection operation request 208. When an inspector 206 detects that a new class of inspection operation request 208 is in the inspection work queue 204, the inspector 206 may pull the request 208 off the inspection work queue 204, determine which class of inspection tool 210 to use or a specific level of inspection to perform, and invoke the specific class of inspection tool or specific level of inspection to perform on the data. The inspector 206 may restore, from the ADP accelerator server computing device 106, a copy of the data object (identified in the class of inspection operation request 208) on which to perform the class of inspection operation. The inspector 206 may then perform the class of inspection operation on the data. The inspector 206 and the copy of identified data restored by the inspector 206 may be located outside of the encrypted security context of the ADP accelerator server computing device 106 and may be located within a user security zone (e.g., a clean room recovery security zone associated with a user).

The inspector 206 may include and/or have access to Application Programming Interfaces (APIs) 212 or Command Line Interfaces (CLIs) that may enable the inspector to leverage and invoke class of inspection tools 210 that may be external cyber-security, data content inspection, and other technologies and techniques. The APIs 212 may be RESTful APIs. The class of inspection tools 210 may include various encryption and decryption techniques, different levels and types of data content inspection scanning tools (e.g., anti-virus and anti-malware scanners), content validation tools, data backup operations, data recovery operations, data replication operations, data disaster recovery operations, and others. The class of inspection tools 210 may be actual data inspection executable files, links to executable files, API or CLI options to invoke data inspection tools, or another implementation of invoking data inspection technologies.

The inspection director 110A may orchestrate class of inspection operations on various data by leveraging a variety of data security technologies and techniques. The inspection director 110A may use the inspection class policy to apply security policies to the class of inspection operations in a consistent, automated, and granular method. The inspector director 110A may enforce security disciplines with policy-based management for securing data. The inspection director 110A also may harvest and store operational metadata, forensics data, and training data for analysis over time. Additionally, the inspection director 110A may monitor for a specific operation (e.g., a backup, recovery, security, or another operation), condition (e.g., a high security alert condition, a government alert level, a company security alert condition, or some other security condition), or event (e.g., a ransomware attack event, a security audit in process event, some other security event, a data protection operation event, or another event). When the inspection director 110A detects a specific operation, condition, or event, the inspection director may view an inspection class policy to determine if there is a class of inspection operation, a cyber security analysis, or a data protection operation that should be performed on data for the specific operation, condition, or event. For each class of inspection operation (e.g., a deeper level or a different type of security inspection such as content inspection for ransomware or malware) or a data protection operation, the inspection director 110A may determine an inspection manager 110B on an ADP accelerator server computing device 106 to carry out the class of inspection or data protection operation and may notify the inspection manager 110B. For each cyber security analysis, the inspection director 110A may invoke the appropriate analysis module.

As an example, an inspection class policy may indicate that under a normal condition, specific data files may have an anti-virus or anti-malware scan performed at time of recovery but not during backup, replication, or other points in a lifecycle of the data. Further, the inspection class policy may specify that an anti-virus or anti-malware scan may be run on any executable file prior to executing the executable file. As a further example, the inspection class policy may specify that a container object have a completely different type of data inspection tool or technology to apply to the container object at one or more certain times or one or more certain events.

As a result, the inspection director 110A may dynamically adjust an inspection class type or level of security inspection applied to data based on the type of operational activity being performed on the data, such as a backup operation or a recovery operation. The inspection class policy may specify that under a normal condition, specific data files may have an anti-virus or anti-malware scan performed at time of recovery but not during backup. The inspection director 110A may monitor for the occurrence of a data protection or security condition or event and when a specific condition is determined to exist (e.g., a high security alert condition) or an event has occurred (e.g., a ransomware attack event is identified), the inspection director 110A may dynamically initiate the inspection class policy to perform an anti-virus or anti-malware scan during any backup operation for specific data. Further, the inspection director 110A may dynamically adjust which class of inspection tool 210 to use (e.g., adjust a data content inspection technology to use or adjust a level of security for the data content inspection technology selected for use) on the identified data.

Additionally, the inspection director 110A may monitor for and detect indications of a data protection or security event including a new ransomware attack. Upon occurrence of the new ransomware attack, the inspection director 110A may use the inspection class policy to identify data upon which to perform additional class of inspection operations. For example, upon occurrence of the new ransomware attack, the inspection director 110A may dynamically initiate a class of inspection operation (e.g., a malware scan operation) against identified data or data types that were created or modified after the start of the new ransomware attack based on a specific inspection class policy. Additionally, the inspection director 110A may perform security operational behavior forensics. The security operational behavior forensics may include analysis of the results of the previous class of inspection operations to assess patterns in security activity. Patterns may include (1) determining whether certain systems or data types are being attacked in any systematic way or (2) determining whether differing cyber security events are related in any way. The security operational behavior forensics may further include comparing over time of security activities and evaluation of results of class of inspection operations. The inspection director 110A may perform various other security operational behavior forensics, perform different security analysis, or take other actions on identified data in the future to dynamically improve the cyber-security of the environment and its data.

As another example, the inspection director 110A may analyze various operational behavior forensics from a number of class of inspection operations collectively and look for patterns or insights. As an example, the inspection director 110A may analyze the results of many class of inspection operations collectively and determine locality patterns such as cyber-attacks that are focusing on operating system environments, application types, networks, regions, organizations or individuals, data types, or other specific targets. The inspection director 110A also may analyze the results of many class of inspection operations collectively and determine insights such as the type of virus or type of malware used to attack and how the cyber-attacks are breaching security defenses. The inspection director 110A may further analyze the results of class of inspection operations collectively and determine other patterns and insights.

The inspection director 110A may continuously perform analysis of a certain observed operational behavior. As an example, an operational behavior may include indications of ransomware attacks that arrive in spurts or groupings at particular periods of time or indications of ransomware attacks hitting adjacent subnetworks simultaneously or indications of ransomware attacks targeting a specific operating system or application type. In addition to analysis of such operational behavior, the inspection director may also continuously monitor for indications of a certain data protection or security condition or event such as indications of a ransomware attack. When the inspection director 110A detects a certain data protection or security condition or event, the inspection director 110A may dynamically increase a scope of time ranges and additional workload related systems over which to perform additional class of inspection operations. The inspection director 110A may initiate a data protection operation such as making an additional copy or performing a recovery of a previous, uncontaminated version of the data into a sanitized, secure location. Upon a certain observed operational behavior, the inspection director 110A may also initiate notifications or alerts for further inspection by security teams.

Based on the results of various security operational behavior forensics (e.g., conclusions from the analysis of the results of many class of inspection operations, individually and collectively, and the observing of patterns and insights), the inspection director 110A may dynamically adjust a class of inspection operation for specific data. As an example, the inspection director 110A may initiate a different, additional class of inspection operation on the suspect data to obtain more details. As another example, the inspection director 110A may initiate a data protection operation such as making an additional copy or performing a recovery of a previous, uncontaminated version of the data into a safe location. Additionally, the inspection director 110A may initiate network zoning, system authentication, resource authentication, or other changes to lower the risk of further cyber-attack penetration. In addition, the inspection director 110A may halt the policy expiration of data from the environment.

The inspection director 110A may use the inspection class policy to determine specific data (e.g., mission-critical data) to have a class of inspection operation dynamically adjusted based on a changing security landscape (e.g., based on changing events and conditions). The inspection director 110A may use metadata associated with a particular data protection or security condition or event as machine learning training data and adjust future cyber security analysis based on the training data.

Figure 3:
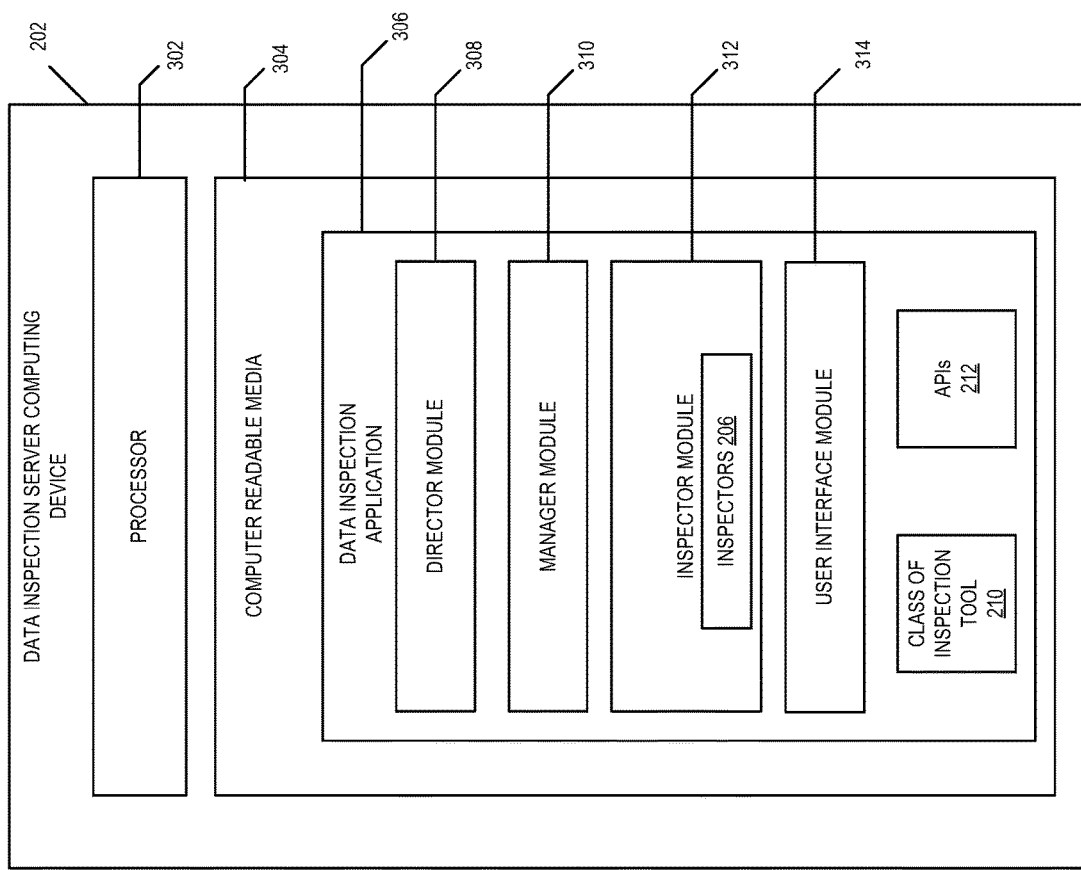
FIG. 3 illustrates a block diagram of a data inspection server computing device of the system according to an example embodiment.

FIG. 3 illustrates a block diagram of the data inspection server computing device 202 according to an example embodiment. The data inspection server computing device 202 may be a computer having a processor 302 and memory, such as a laptop, desktop, tablet computer, mobile computing device (e.g., a smartphone), or a dedicated electronic device having a processor and memory. The one or more processors 302 process machine/computer-readable executable instructions and data, and the memory stores machine/computer-readable executable instructions and data including one or more applications, including the data inspection application 306 that executes in conjunction with the inspection director 110A and the inspection manager 110B. The processor 302 and memory are hardware. The memory includes random access memory (RAM) and non-transitory memory, e.g., a non-transitory computer-readable storage medium such as one or more flash storages or hard drives. The non-transitory memory may include any tangible computer-readable medium including, for example, magnetic and/or optical disks, flash drives, and the like. Additionally, the memory may also include a dedicated file server having one or more dedicated processors, random access memory (RAM), a Redundant Array of Inexpensive/Independent Disks (RAID) hard drive configuration, and an Ethernet interface or other communication interface, among other components.

The data inspection server computing device 202 uses the data inspection application 306 to transmit data, messages, and/or resources to the one or more client computing devices 102 and receive messages, data, and/or resources from the one or more client computing devices 102.

The data inspection server computing device 202 includes computer readable media (CRM) 304 in memory on which a data inspection application 306 and/or other application is stored. The computer readable media may include volatile media, nonvolatile media, removable media, non-removable media, and/or another available medium that can be accessed by the processor 302. By way of example and not limitation, the computer readable media comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The data inspection application 306 includes the following modules. The modules may include sub-modules that may be associated with the ADP accelerator server computing device 106 and thus portions of the inspection director 110A may be executed by the ADP accelerator server computing device 106 and/or the ADP analytics director server computing device 104.

The data inspection application 306 may include a director module 308. The director module 308 is in communication with the inspection director 110A of each ADP analytics server computing device 104. In one example, the director module 308 operates in communication between the inspection director 110A and each inspector 206 of the data inspection server computing device 202.

The data inspection application 306 may include a manager module 310. The manager module 310 is in communication with the inspection manager 110B of each ADP accelerator server computing device 106. In one example, the manager module 310 operates in communication between the inspection manager 110B.

The data inspection application 306 may include an inspector module 312. The inspector module 312 provides the data inspection application 306 access to one or more inspectors 206 that have access to the inspection work queue 204 provided by the ADP accelerator server computing device 106. The inspection work queue 204 includes one or more class of inspection operation requests 208. Each class of inspection operation request 208 may be received by an inspector 206 of the inspector module 312 and processed. Each class of inspection operation request 208 may be processed by a respective inspector 206 using the one or more APIs 212 or CLIs and/or one or more class of inspection tools 210.

The data inspection application 306 may include a user interface module 314. The user interface module 314 may receive requests or other communications from the client computing devices 102 and transmit a representation of requested information, user interface elements, and other data and communications to the client computing device 102 for display. As an example, the user interface module 314 may generate a native and/or web-based graphical user interface (GUI) that accepts input and provides output by generating content that is transmitted via the communications network 108 and viewed by a user of the client computing device 102. The GUI may be the ADP Commander discussed herein. The user interface module 314 may provide realtime, automatically and dynamically refreshed information to the user of the client computing device 102 using Java, Javascript, AJAX (Asynchronous Javascript and XML), ASP.NET, Microsoft .NET, and/or node.js, among others. The user interface module 314 may send data to other modules of the data inspection application 306 and retrieve data from other modules of the data inspection application 306 asynchronously without interfering with the display and behavior of the data inspection application 306 displayed by the client computing device 102. As an example, data may be retrieved using XMLHttpRequest objects or using Web Sockets.

Figure 4:
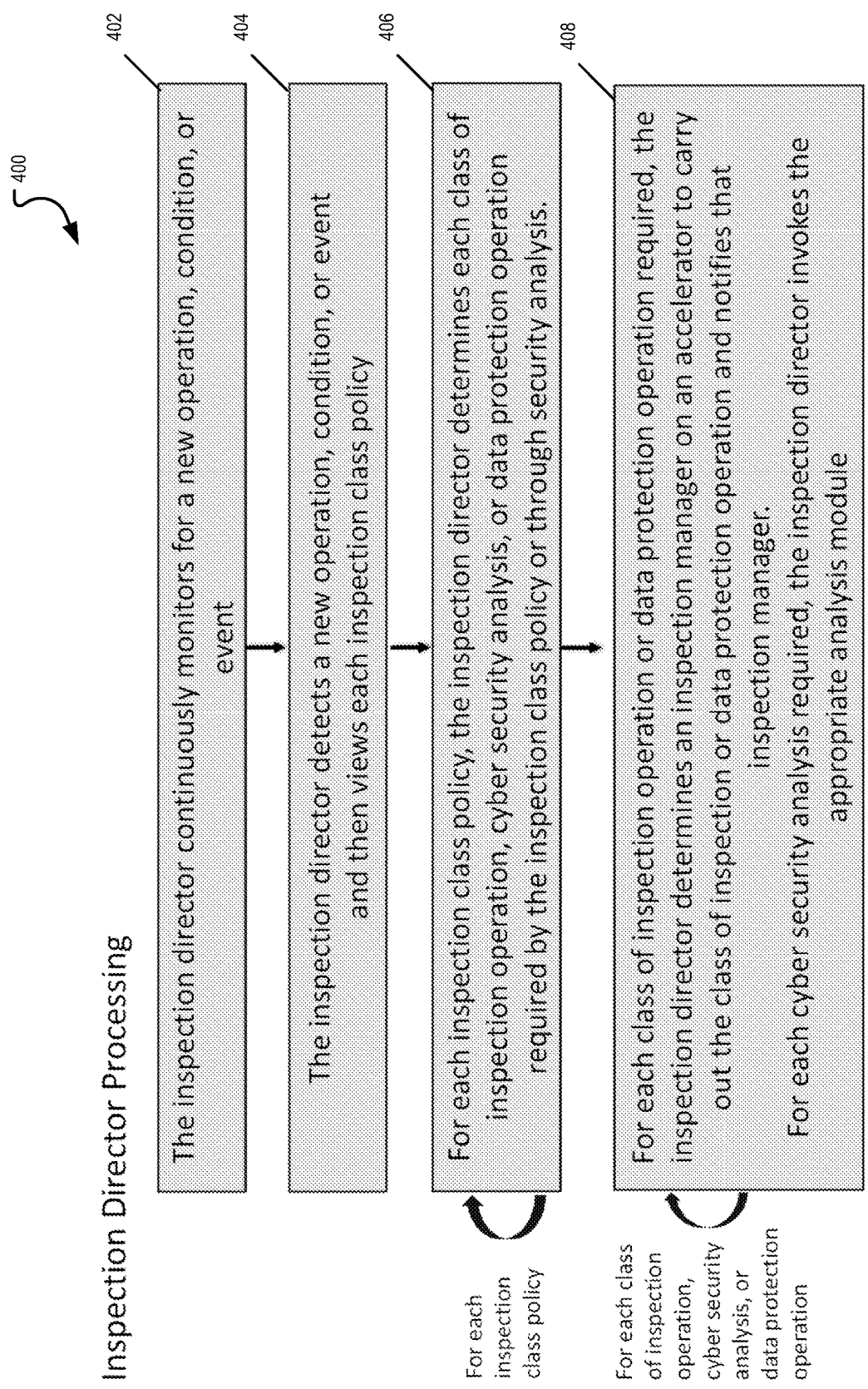
FIG. 4 illustrates a flowchart of a process for an inspection director according to an example embodiment.

FIG. 4 illustrates a flowchart of a process 400 for the inspection director 110A according to an example embodiment. As shown in FIG. 4, in step 402, the inspection director 110A may continuously monitor for a new operation, condition, or event. In step 404, the inspection director 110A may detect a new operation, condition, or event and may view each inspection class policy. In step 406, for each inspection class policy, the inspection director 110A may determine each class of inspection operation, cyber security analysis, or data protection operation associated with the inspection class policy or determined through security analysis. In step 408, for each class of inspection operation or data protection operation, the inspection director 110A may determine an inspection manager 110B on an accelerator server computing device 106 to carry out the class of inspection or data protection operation and may notify the inspection manager 110B. For each cyber security analysis, the inspection director 110A may invoke the appropriate analysis module.

Figure 5:
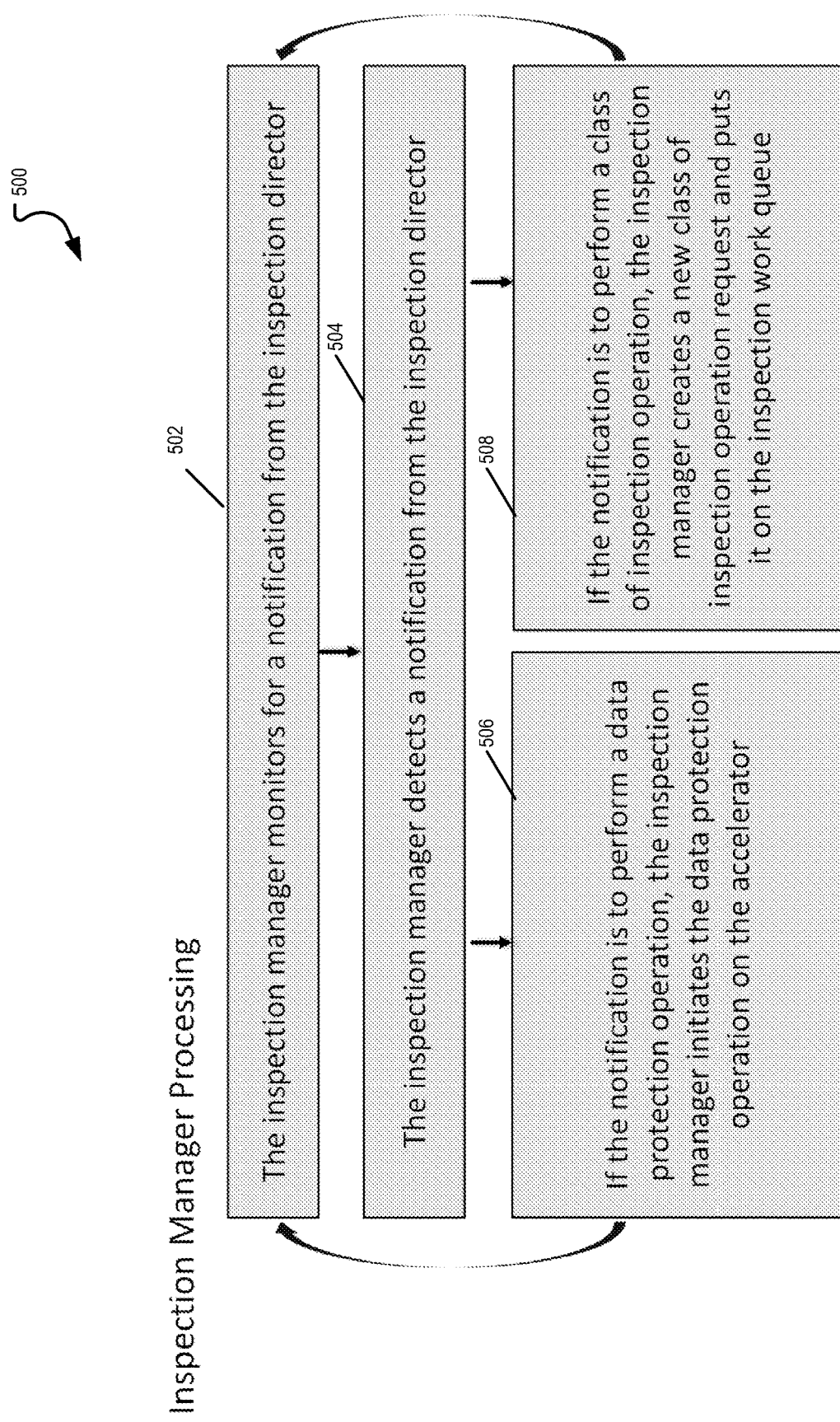
FIG. 5 illustrates a flowchart of a process for an inspection manager according to an example embodiment.

FIG. 5 illustrates a flowchart of a process 500 for the inspection manager 110B according to an example embodiment. As shown in FIG. 5, in step 502, the inspection manager 110B may monitor for a notification from the inspection director 110A. In step 504, the inspection manager 110B may detect a notification from the inspection director 110A. In step 506, if the notification is to perform a data protection operation, the inspection manager 110B may initiate the data protection operation on the accelerator server computing device 106. In step 508, if the notification is to perform a class of inspection operation, the inspection manager 110B may create a new class of inspection operation request 208 and may put the request on the inspection work queue 204.

Figure 6:
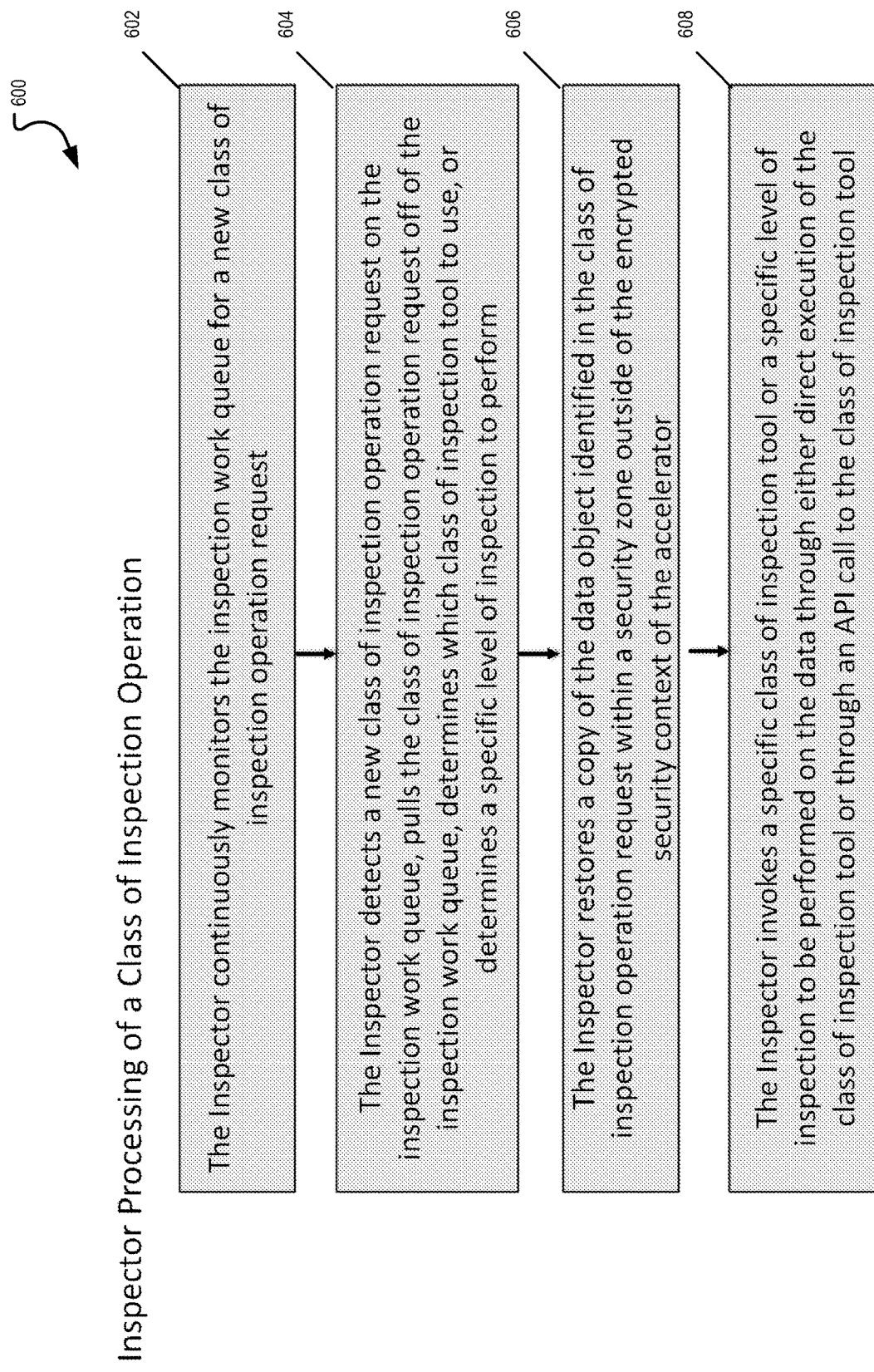
FIG. 6 illustrates a flowchart of a process for a class of inspection operation according to an example embodiment.

FIG. 6 illustrates a flowchart of a process 600 for a class of inspection operation that may be executed by the data inspection application 306, the inspection director 110A, and/or the inspection manager 110B according to an example embodiment. As shown in FIG. 6, in step 602, the inspector 206 may continuously monitor the inspection work queue 204 for a new class of inspection operation request 208. In step 604, the inspector 206 may detect a new class of inspection operation request 208 on the inspection work queue 204. The inspector 206 may pull the class of inspection operation request 208 off of the inspection work queue 204 and determine which class of inspection tool to use 210 or determine a specific level of inspection to perform. In step 606, the inspector 206 may restore a copy of the data object identified in the class of inspection operation request 208 within a security zone outside of the encrypted security context of the ADP accelerator server computing device 106. In step 608, the inspector 206 may invoke a specific class of inspection tool 210 or a specific level of inspection to be performed on the data through execution of the class of inspection tool 210 or using an API call 212 or CLI to the class of inspection tool 210. The specific class of inspection tool 210 or specific level of inspection may be utilized at one of a certain time (or a number of times) and a certain event during a data lifecycle of the data object.

Figure 7:
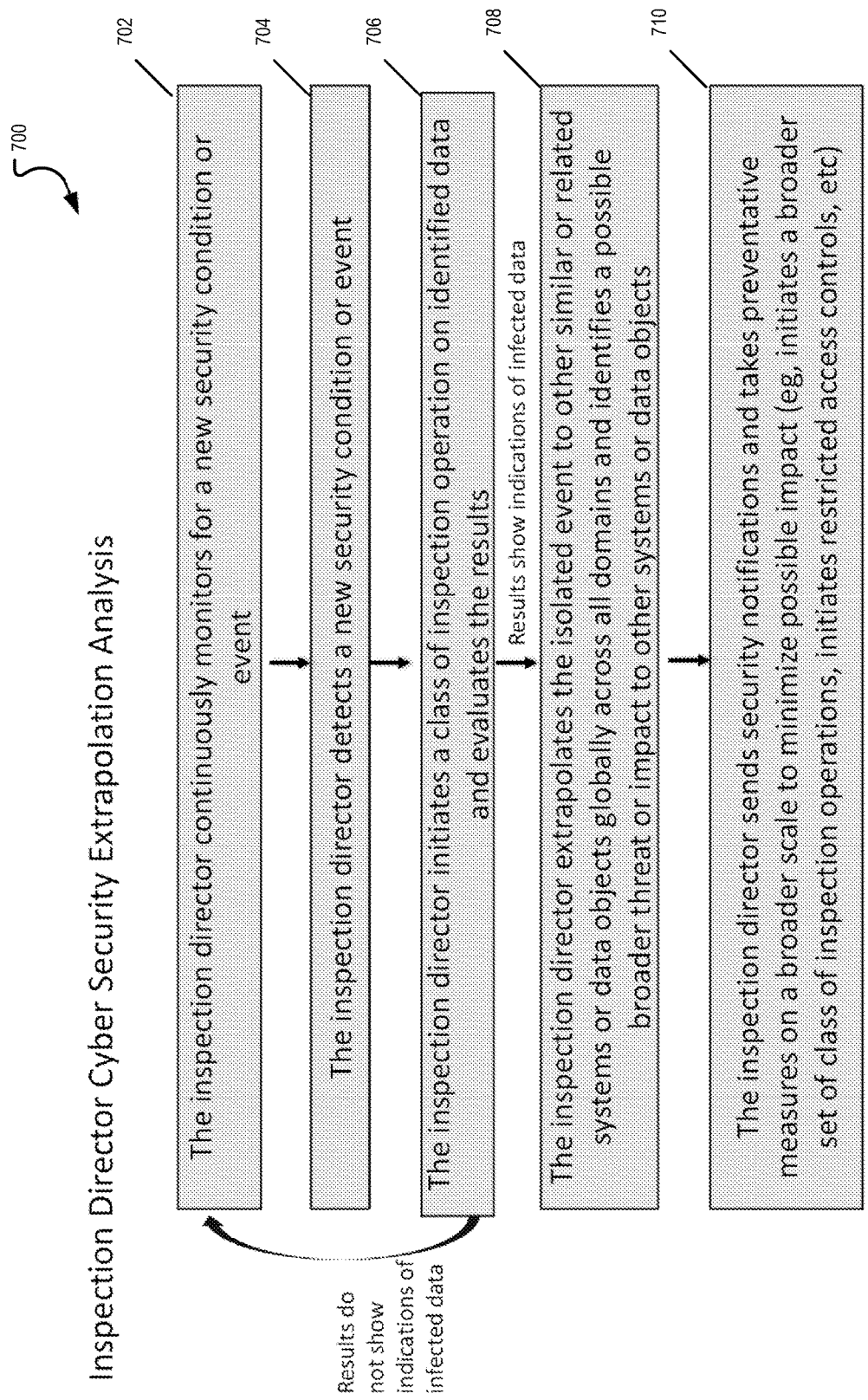
FIG. 7 illustrates a flowchart of a process for cyber security extrapolation analysis according to an example embodiment.

FIG. 7 illustrates a flowchart of a process 700 for cyber security extrapolation analysis that may be executed by the data inspection application 306, the inspection director 110A, and/or the inspection manager 110B according to an example embodiment. As shown in FIG. 7, in step 702, the inspection director 110A may continuously monitor for a new security condition or event. In step 704, the inspection director 110A may detect a new security condition or event. In step 706, the inspection director 110A may initiate a class of inspection operation on identified data and evaluate the results. In step 708, when the results show indications of infected data, the inspection director 110A may extrapolate the isolated event to other similar or related systems or data objects globally across all domains and identify a possible broader threat or impact to other systems or data objects. In step 710, the inspection director 110A may send security notifications and take preventative measures on a broader scale to minimize possible impact (e.g., may initiate a broader set of class of inspection operations, initiate restricted access controls, or others).

Figure 8:
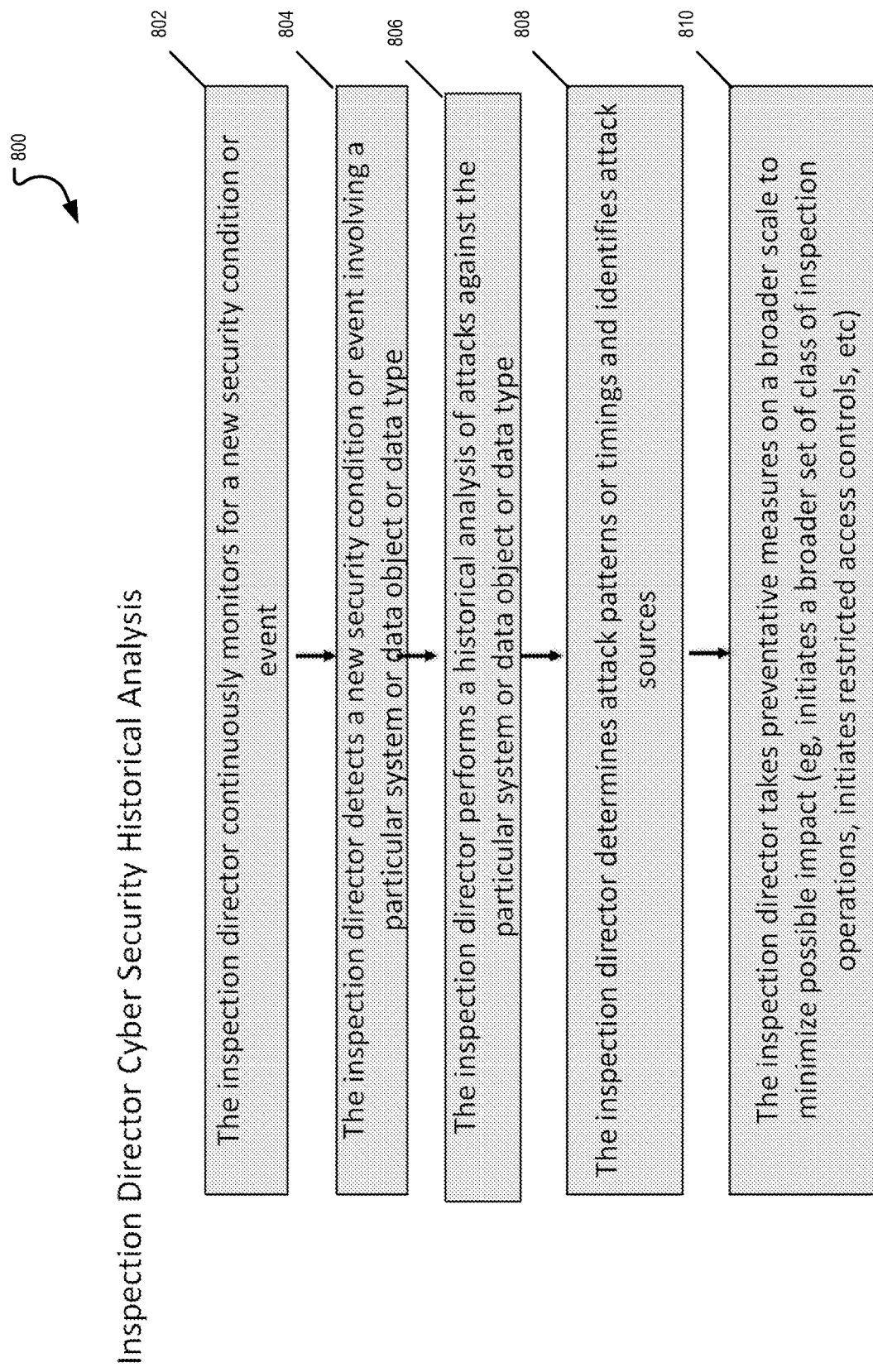
FIG. 8 illustrates a flowchart of a process for cyber security historical analysis according to an example embodiment.

FIG. 8 illustrates a flowchart of a process 800 for cyber security historical analysis that may be executed by the data inspection application 306, the inspection director 110A, and/or the inspection manager 110B according to an example embodiment. As shown in FIG. 8, in step 802, the inspection director 110A may continually monitor for a new security condition or event. In step 804, the inspection director 110A may detect a new security condition or event involving a particular system or data object or data type. In step 806, the inspection director 110A may perform a historical analysis of attacks against the particular system or data object or data type. In step 808, the inspection director 110A may determine attack patterns or timings and may identify one or more attack sources. In step 810, the inspection director 110A may take preventative measures on a broader scale to minimize possible impact (e.g., may initiate a broader set of class of inspection operations, initiate restricted access controls, or others).

Figure 9:
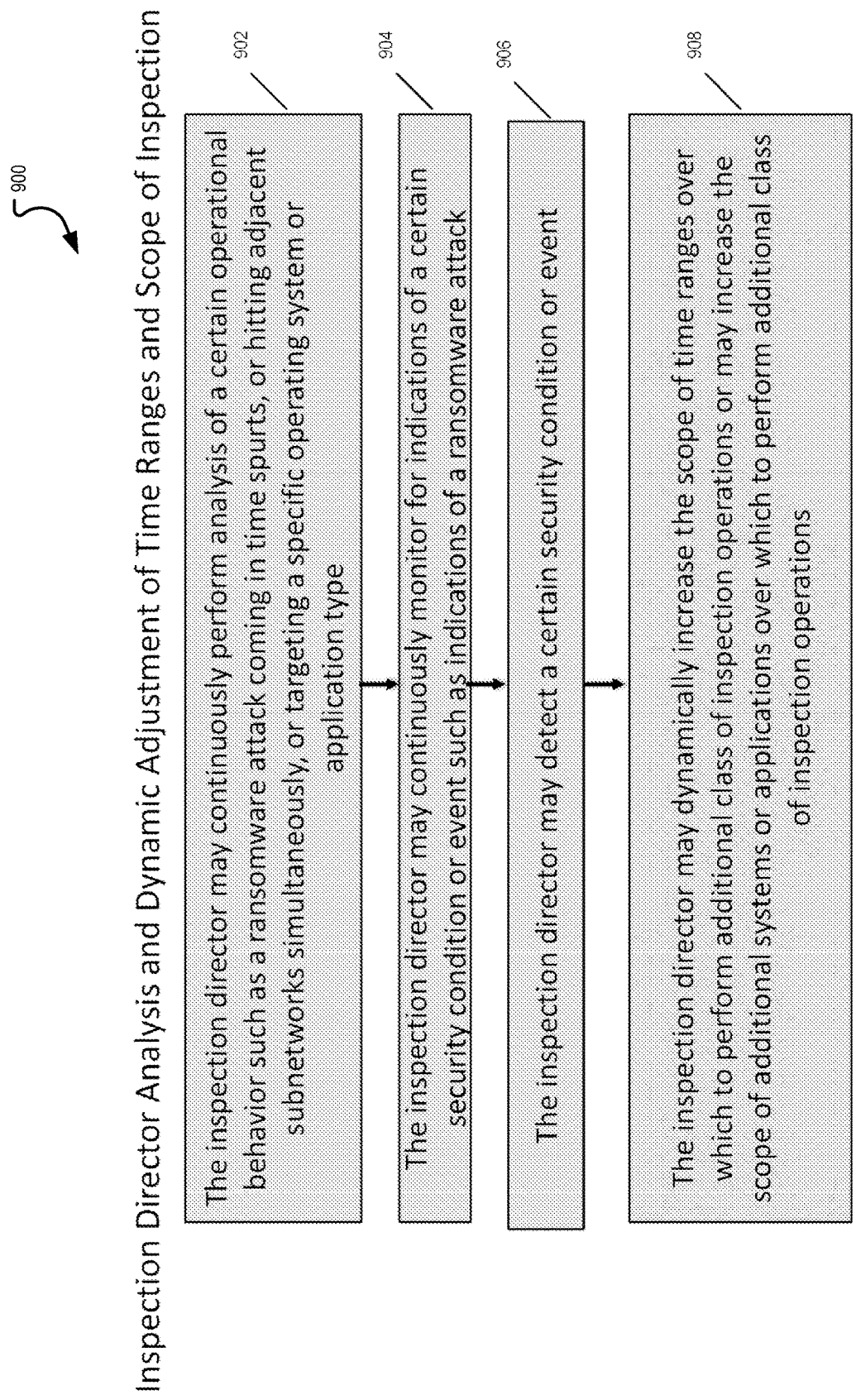
FIG. 9 illustrates a flowchart of a process for analysis and dynamic adjustment of time ranges and scope of inspection according to an example embodiment.

FIG. 9 illustrates a flowchart of a process 900 for analysis and dynamic adjustment of time ranges and scope of inspection that may be executed by the data inspection application 306, the inspection director 110A, and/or the inspection manager 110B according to an example embodiment. As shown in FIG. 9, in step 902, the inspection director 110A may continuously perform analysis of a certain operational behavior such as one or more ransomware attacks that may come in spurts at one or more times. In addition, the ransomware attack also may hit adjacent subnetworks simultaneously or may target a specific operating system or one or more applications. In step 904, the inspection director 110A may continuously monitor for indications of a certain security condition or event such as indications of one or more ransomware attacks. In step 906, the inspection director 110A may detect one of a certain security condition or event. In step 908, the inspection director 110A may dynamically increase a scope of time ranges to perform additional class of inspection operations. Alternatively, the inspection director 110A may increase a scope of additional systems or applications over which to perform the additional class of inspection operations.

Figure 10:
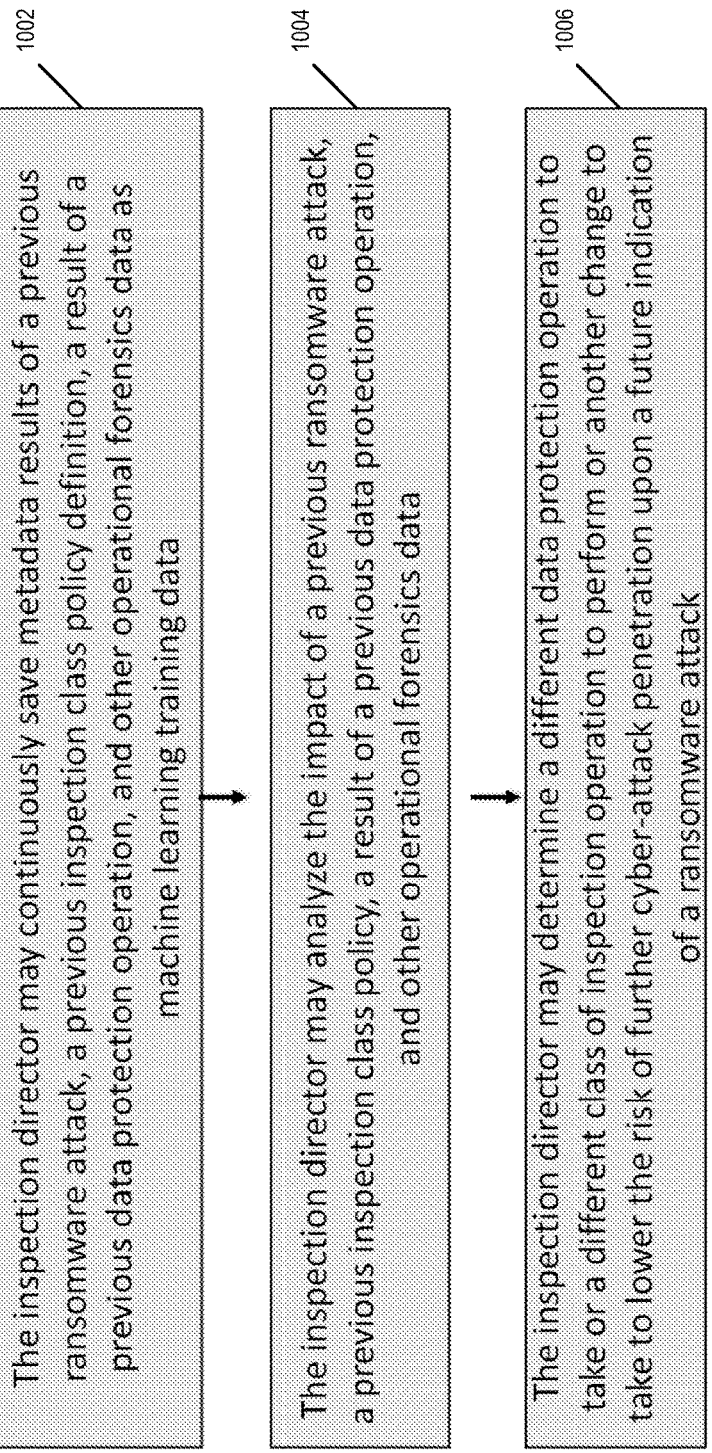
FIG. 10 illustrates a flowchart of a process for analysis of machine learning training data and dynamic adjustment of class of inspection operations according to an example embodiment.

FIG. 10 illustrates a flowchart of a process 1000 for analysis of machine learning training data and dynamic adjustment of class of inspection operations that may be executed by the data inspection application 306, the inspection director 110A, and/or the inspection manager 110B according to an example embodiment. As shown in FIG. 10, in step 1002, the inspection director 110A may continuously save or store metadata results associated with a previous ransomware attack, a previous inspection class policy definition, a result of a previous data protection operation, and/or other operational forensics data as machine learning training data. In step 1004, the inspection director 110A may analyze one or more impacts associated with the previous ransomware attack, the previous inspection class policy, the result of the previous data protection operation, or other operational forensics data. In step 1006, the inspection director 110A may determine a different data protection operation to utilize, a different class of inspection operation to perform, or another type of change to lower a risk of further cyber-attack penetration upon a future indication of a ransomware attack.

FIG. 11 illustrates an example of an inspection class policy 1100 of the system according to an example embodiment. The inspection class policy 1100 may have an example data structure as shown in FIG. 11 and as indicated below.

DataRules[ ]—used to specify data to be associated with this inspection class policy IncludeData: RegularExpression—data with file or object names matching the regular expression are included (associated) with this inspection class policy ExcludeData: RegularExpression—data with file or object names matching the regular expression are excluded (not associated) with this inspection class policy DataWorkload: TypeOfWorkload—application or data workload type DataType: TypeOfData—file, object, structured, block, or other type of data DataCopyType: TypeOfDataCopy—primary, backup, DR, replication, or recovered copy of data DataOwner: OwnerOfData DataCreationTime: TimeOfDataCreation—date and time data was originally created LastModificationTime—date and time data was last modified InspectionEvent[ ]—a class of inspection to perform upon occurrence of an event or condition EventOrCondition—a specific event or condition that triggers a class of inspection operation including ClassOfInspection—(e.g., an inspection class type or level of content inspection)

CyberSecurityAnalysis—type of cyber security analysis to perform on the data upon occurrence of the event or condition DataProtectionOperation—type of data protection operation to perform on the data upon occurrence of the event or condition PerformScanIfExecutable—Specifies a virus scan be performed prior to running if executable file, program library, etc.

EnableDynamicInspection—enable data associated with this inspection class policy to have class of inspection operations dynamically adjusted and performed based on a changing security landscape (including various security conditions or events, evolving security best practices, etc.)

FIG. 12 illustrates an example of a class of inspection operation request 1200 of the system according to an example embodiment. The class of inspection operation request may have a data structure as shown in FIG. 12 and as indicated below.

DataObject—link to data on which to perform a class on inspection operation on

ClassOfInspectionTool—a specific class of inspection tool to use

ClassOfInspectionLevel—a specific level of inspection to perform with the class of inspection tool (if not applicable, field is NULL)

Figure 13:
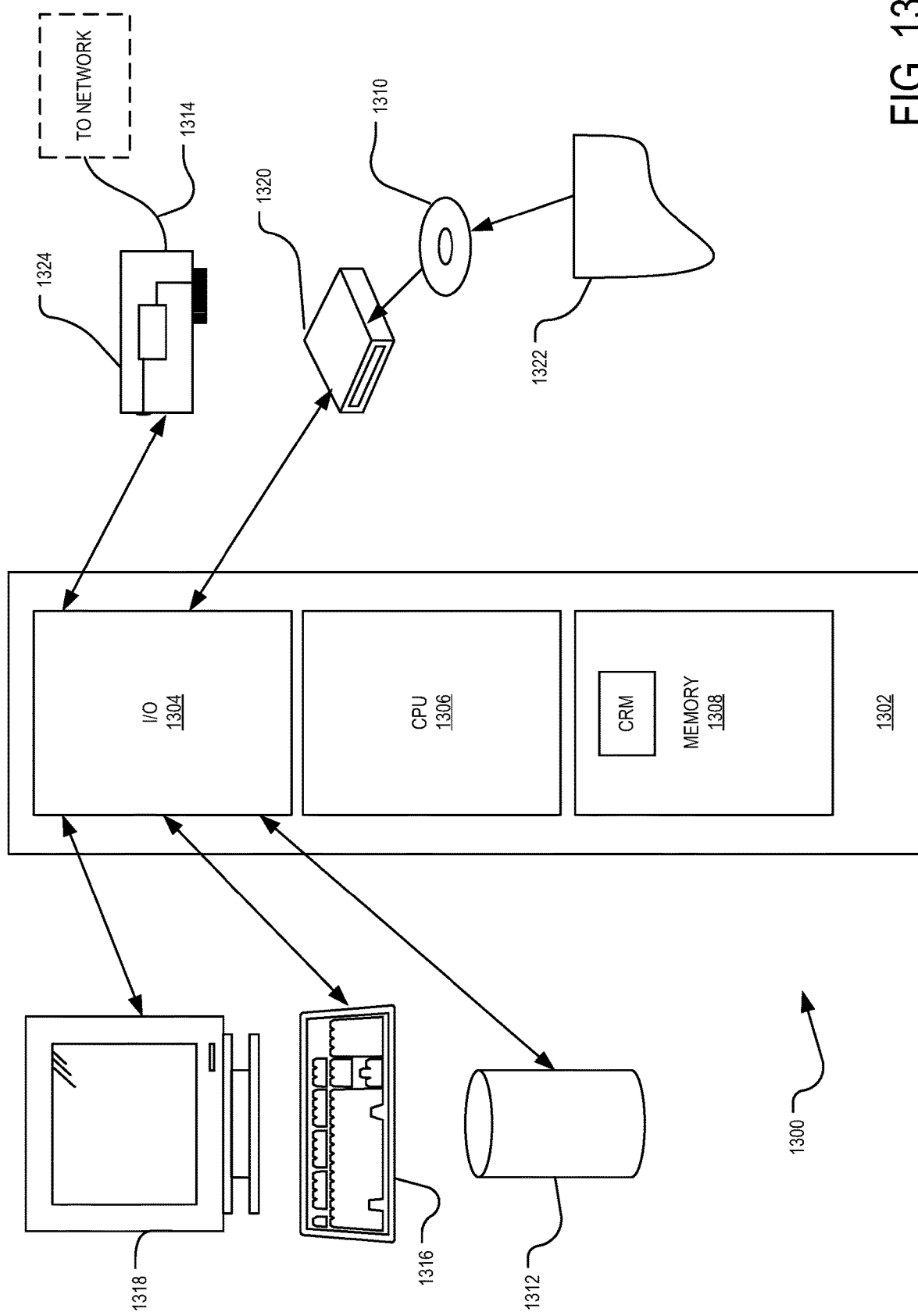
FIG. 13 illustrates a block diagram of an example computer device for use with the example embodiments.

FIG. 13 illustrates an example computing system 1300 that may implement various systems, such as the client computing device 102, the ADP analytics server computing device 104, the ADP accelerator server computing device 106, the data inspection server computing device 202, and the methods discussed herein, such as process 400, process 500, process 600, process 700, process 800, process 900, and process 1000. A general-purpose computer system 1300 is capable of executing a computer program product to execute a computer process. Data and program files may be input to the computer system 1300, which reads the files and executes the programs therein such as the inspection director 110A, the inspection manager 110B, and the data inspection application 306. Some of the elements of a general-purpose computer system 1300 are shown in FIG. 13 wherein a processor 1302 is shown having an input/output (I/O) section 1304, a central processing unit (CPU) 1306, and a memory section 1308. There may be one or more processors 1302, such that the processor 1302 of the computer system 1300 comprises a single central-processing unit 1306, or a plurality of processing units, commonly referred to as a parallel processing environment. The computer system 1300 may be a conventional computer, a server, a distributed computer, or any other type of computer, such as one or more external computers made available via a cloud computing architecture. The presently described technology is optionally implemented in software devices loaded in memory 1308, stored on a configured DVD/CD-ROM 1310 or storage unit 1312, and/or communicated via a wired or wireless network link 1314, thereby transforming the computer system 1300 in FIG. 13 to a special purpose machine for implementing the described operations.

The memory section 1308 may be volatile media, non-volatile media, removable media, non-removable media, and/or other media or mediums that can be accessed by a general purpose or special purpose computing device. For example, the memory section 1308 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1304 is connected to one or more user-interface devices (e.g., a keyboard 1316 and a display unit 1318), a disc storage unit 1312, and a disc drive unit 1320. Generally, the disc drive unit 1320 is a DVD/CD-ROM drive unit capable of reading the DVD/CD-ROM medium 1310, which typically contains programs and data 1322. Computer program products containing mechanisms to effectuate the systems and methods in accordance with the presently described technology may reside in the memory section 1308, on a disc storage unit 1312, on the DVD/CD-ROM medium 1310 of the computer system 1300, or on external storage devices made available via a cloud computing architecture with such computer program products, including one or more database management products, web server products, application server products, and/or other additional software components. Alternatively, a disc drive unit 1320 may be replaced or supplemented by a floppy drive unit, a tape drive unit, or other storage medium drive unit. The network adapter 1324 is capable of connecting the computer system 1300 to a network via the network link 1314, through which the computer system can receive instructions and data. Examples of such systems include personal computers, Intel or PowerPC-based computing systems, AMD-based computing systems, ARM-based computing systems, and other systems running a WINDOWS-based, a UNIX-based, a LINUX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1300 is connected (by wired connection and/or wirelessly) to a local network through the network interface or adapter 1324, which is one type of communications device. When used in a WAN-networking environment, the computer system 1300 typically includes a modem, a network adapter, or any other type of communications device for establishing communications over the wide area network. In a networked environment, program modules depicted relative to the computer system 1300 or portions thereof, may be stored in a remote memory storage device. It is appreciated that the network connections shown are examples of communications devices for and other means of establishing a communications link between the computers may be used.

In an example implementation, source code executed by the client computing device 102, the ADP analytics server computing device 104, the ADP accelerator server computing device 106, the data inspection server computing device 202, a plurality of internal and external databases, source databases, and/or cached data on servers are stored in the storage of ADP accelerator, memory of the client computing device 102, memory of the ADP analytics server computing device 104, memory of ADP accelerator server computing device 106, memory of the data inspection server computing device 202, or other storage systems, such as the disk storage unit 1312 or the DVD/CD-ROM medium 1310, and/or other external storage devices made available and accessible via a network architecture. The source code executed by the client computing device 102, the ADP analytics server computing device 104, the ADP accelerator server computing device 106, and the data inspection server computing device 202 may be embodied by instructions stored on such storage systems and executed by the processor 1302.

Some or all of the operations described herein may be performed by the processor 1302, which is hardware. Further, local computing systems, remote data sources and/or services, and other associated logic represent firmware, hardware, and/or software configured to control operations of the data inspection system 100 and/or other components. Such services may be implemented using a general-purpose computer and specialized software (such as a server executing service software), a special purpose computing system and specialized software (such as a mobile device or network appliance executing service software), or other computing configurations. In addition, one or more functionalities disclosed herein may be generated by the processor 1302 and a user may interact with a Graphical User Interface (GUI) using one or more user-interface devices (e.g., the keyboard 1316, the display unit 1318, and the user devices 1304) with some of the data in use directly coming from online sources and data stores. The system set forth in FIG. 13 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A data security system comprising:
a memory; and
at least one processor to:
continuously monitor, by the at least one processor, for an event involving a data object or type of data object;
access, by the at least one processor in the memory, an inspection class policy to determine a class of inspection tool or a specific level of inspection to use on the data object or type of data object based on the event, wherein the class of inspection tool includes one of an anti-virus scanner and an anti-malware scanner, and wherein the inspection class policy specifies that the one of the class of inspection tool and the specific level of inspection is to be used on the data object or type of data object in one or more events and not used on the data object or type of data object in one or more other events;
execute, by the at least one processor the one of the class of inspection tool and the specific level of inspection on the data object or type of data object responsive to the event; and
restore a copy of the data object identified by the class of inspection operation request within a security zone outside of an encrypted security context of an accelerator server computing device.

2. The data security system of claim 1, wherein the event is an event in a data lifecycle of the data object or type of data object.

3. The data security system of claim 1, the at least one processor further to continuously monitor, by at least one inspection manager, for a notification from an inspection director, detect the notification from the inspection director, determine that the notification indicates to perform a data protection operation, and execute the data protection operation on an accelerator server computing device.

4. The data security system of claim 1, the at least one processor further to continuously monitor, by at least one inspection director, for one of a new operation, condition, and event, detect one of the new operation, condition, and event, determine an appropriate inspection class policy, determine a class of inspection operation based on the inspection class policy, determine an appropriate inspection manager to execute the class of inspection operation, and notify the appropriate inspection manager executed by an accelerator server computing device.

5. The data security system of claim 1, wherein an inspection class policy defines the class of inspection tool and the specific level of inspection on a specific type of data.

6. The data security system of claim 5, wherein the inspection class policy defines a data protection operation to perform on the specific type of data at one of a certain time and a certain event during a data lifecycle of the data object or type of data object.

7. A data security method comprising:
continuously monitoring, by at least one processor, for an event involving a data object or type of data object;
accessing, by the at least one processor, an inspection class policy to determine one of a class of inspection tool and a specific level of inspection to use on the data object or type of data object based on the event, wherein the class of inspection tool includes one of an anti-virus scanner and an anti-malware scanner, and wherein the inspection class policy specifies that the one of the class of inspection tool and the specific level of inspection is to be used on the data object or type of data object in one or more events and not used on the data object or type of data object in one or more other events;

executing, by the at least one processor, the one of the class of inspection tool and the specific level of inspection on the data object or type of data object responsive to the event; and restoring a copy of the data object or type of data object identified by the class of inspection operation request within a security zone outside of an encrypted security context of an accelerator server computing device.

8. The data security method of claim 7, wherein the event is an event in a data lifecycle of the data object or type of data object.

9. The method of claim 7, further comprising continuously monitoring, by at least one inspection manager, for a notification from an inspection director, detecting the notification from the inspection director, determining that the notification indicates to perform a data protection operation, and executing the data protection operation on an accelerator server computing device.

10. The method of claim 7, further comprising continuously monitoring, by at least one inspection director, for one of a new operation, condition, and event, detecting one of the new operation, condition, and event, determining an appropriate inspection class policy, determining a class of inspection operation based on the inspection class policy, determining an appropriate inspection manager to execute the class of inspection operation, and notifying the appropriate inspection manager executed by an accelerator server computing device.

11. The method of claim 7, wherein an inspection class policy defines the class of inspection tool and the specific level of inspection on a specific type of data.

12. The method of claim 11, wherein the inspection class policy defines a data protection operation to perform on the specific type of data at one of a certain time and a certain event during a data lifecycle of the data object or type of data object.

13. A non-transitory computer-readable storage medium, having instructions stored thereon that, when executed by at least one processor, cause the at least one processor to perform operations, the operations comprising:

continuously monitoring, by the at least processor, for an event involving a data object or type of data object;

accessing, by the at least one processor in a memory, an inspection class policy to determine one of a class of inspection tool and a specific level of inspection to use on the data object or type of data object based on the event, wherein the class of inspection tool includes one of an anti-virus scanner and an anti-malware scanner, and wherein the inspection class policy specifies that the one of the class of inspection tool and the specific level of inspection is to be used on the data object or type of data object in one or more events and not used on the data object or type of data object in one or more other events; and executing, by the at least one processor, the one of the class of inspection tool and the specific level of inspection on the data object or type of data object responsive to the event; and restoring a copy of the data object or type of data object identified by the class of inspection operation request within a security zone outside of an encrypted security context of an accelerator server computing device.

14. The non-transitory computer-readable storage medium of claim 13, wherein the event is an event in a data lifecycle of the data object or type of data object.

15. The non-transitory computer-readable storage medium of claim 13, the operations further comprising continuously monitoring by at least one inspection manager, for a notification from an inspection director, detecting the notification from the inspection director, determining that the notification indicates to perform a data protection operation, and executing the data protection operation on an acceleration server computing device.

16. The non-transitory computer-readable storage medium of claim 13, the operations further comprising continuously monitoring by at least one inspection director, for one of a new operation, condition, and event, detecting one of the new operation, condition, and event, determining an appropriate inspection class policy, determining a class of inspection operation based on the inspection class policy, determining an appropriate inspection manager to execute the class of inspection operation, and notifying the appropriate inspection manager executed by an acceleration server computing device.

17. The non-transitory computer-readable storage medium of claim 13, wherein an inspection class policy defines the class of inspection tool and the specific level of inspection on a specific type of data.

18. The non-transitory computer-readable storage medium of claim 17, wherein the inspection class policy defines a data protection operation to perform on the specific type of data at one of a certain time and a certain event during a data lifecycle of the data object or type of data object.

* * * * *